(12) United States Patent
Imai et al.

(10) Patent No.: US 6,718,545 B1
(45) Date of Patent: Apr. 6, 2004

(54) APPARATUS FOR MANAGING RESOURCES OF A SIGNAL PROCESSOR, A RESOURCE MANAGING PROGRAM TRANSFERRING METHOD AND RECORDING MEDIUM

(75) Inventors: Takeshi Imai, Hamura (JP); Hiroki Sato, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/459,870

(22) Filed: Dec. 13, 1999

(30) Foreign Application Priority Data

Dec. 21, 1998 (JP) .......................... 10-363053
Apr. 1, 1999 (JP) ............................ 11-94605

(51) Int. Cl.[7] .......................... G06F 9/44; G06F 9/445; G06F 15/00; G10H 7/00
(52) U.S. Cl. ...................................... 717/168; 717/174
(58) Field of Search ........................... 84/602; 712/43; 717/168, 174

(56) References Cited

U.S. PATENT DOCUMENTS 3,631,405 A * 12/1971 Hoff et al. .................. 712/209
3,812,470 A * 5/1974 Murtha et al. ............... 712/221
5,239,628 A * 8/1993 Hasebe et al. ............... 713/400
5,442,125 A 8/1995 Hanzawa et al. ............... 64/602
5,590,364 A 12/1996 Hanzawa et al. ............... 712/43
5,898,878 A * 4/1999 Densham et al. ........... 710/260
6,311,263 B1 * 10/2001 Barlow et al. ................. 712/36
6,367,002 B1 * 4/2002 Birkhauser .................. 712/206
6,397,385 B1 * 5/2002 Kravitz ........................ 717/173
6,427,236 B1 * 7/2002 Chamberlain et al. ...... 717/174

* cited by examiner

Primary Examiner—Antony Nguyen-Ba
(74) Attorney, Agent, or Firm—Frishauf, Holtz, Goodman & Chick, P.C.

(57) ABSTRACT

A signal processor executes a required process based on a program stored in a RAM connected to the signal processor. The program is transferred from a ROM connected to a CPU, as requested. When the CPU determines based on the status of the RAM that the contents of a particular one of instructions which compose a particular program among the programs stored in the ROM should be changed, the CPU changes the contents of the instruction and transfers the changed instruction to the RAM. When a first one of a plurality of programs stored in the RAM is replaced with a second program transferred from the ROM, and the areas of the RAM used by the first and second programs are different, the CPU also changes the contents of instructions of other programs which are not required to be replaced.

8 Claims, 19 Drawing Sheets

FIG.14

| No. | NAME | MODE1 PART | MODE2 PART | MODE3 PART | ALTERNATIVE Fx | PROGRAM SIZE | INTERNAL DATA SIZE | EXTERNAL DATA SIZE |
|---|---|---|---|---|---|---|---|---|
| 0 | Thru | - | 1~8 | 1~4 | - | 4 | 4 | 0 |
| 1 | St Thru | 1~4 | - | 5~6 | - | 8 | 8 | 0 |
| 2 | Mix | - | - | MIX | - | 32 | 4 | 0 |
| 3 | Comp 1 | - | 1~8 | 1~4 | - | 100 | 16 | 32 |
| 4 | Comp 2 | - | 1~8 | 1~4 | Comp 1 | 150 | 32 | 64 |
| 5 | St Comp 1 | 1~4 | - | 5~6 | - | 200 | 32 | 64 |
| 6 | St Comp 2 | 1~4 | - | 5~6 | Stereo Comp 1 | 300 | 64 | 128 |
| 7 | Dist 1 | - | 1~8 | 1~4 | - | 120 | 16 | 32 |
| 8 | Dist 2 | - | 1~8 | 1~4 | Dist 1 | 180 | 32 | 64 |
| 9 | EQ 1 | - | 1~8 | 1~4 | - | 60 | 16 | 16 |
| 10 | EQ 2 | - | 1~8 | 1~4 | EQ 1 | 90 | 32 | 32 |
| 11 | EQ 3 | - | 1~8 | 1~4 | EQ 2 | 120 | 48 | 48 |
| 12 | St EQ 1 | 1~4 | - | 5~6 | - | 60 | 16 | 16 |
| 13 | St EQ 2 | 1~4 | - | 5~6 | EQ 1 | 90 | 32 | 32 |
| 14 | St EQ 3 | 1~4 | - | 5~6 | EQ 2 | 120 | 48 | 48 |
| 15 | Mono Cho 1 | - | 1~8 | 1~4 | - | 100 | 32 | 128 |
| 16 | Mono Cho 2 | - | 1~8 | 1~4 | Mono cho 1 | 150 | 48 | 192 |
| 17 | St Cho 1 | 1~4 | - | 5~6 | - | 180 | 32 | 64 |
| 18 | St Cho 2 | 1~4 | - | 5~6 | St cho 1 | 200 | 64 | 128 |
| 19 | Mono Delay 1 | - | 1~8 | 1~4 | - | 80 | 32 | 1000 |
| 20 | Mono Delay 2 | - | 1~8 | 1~4 | Mono Delay 1 | 120 | 48 | 1000 |
| 21 | St Delay 1 | 1~4 | - | 5~6 | - | 160 | 32 | 2000 |
| 22 | St Delay 2 | 1~4 | - | 5~6 | St Delay 1 | 200 | 64 | 2000 |
| 23 | Mono Rev 1 | - | 1~8 | 1~4 | - | 150 | 80 | 500 |
| 24 | Mono Rev 2 | - | 1~8 | 1~4 | Mono Rev 1 | 200 | 120 | 1000 |
| 25 | St Rev 1 | 1~4 | - | 5~6 | - | 200 | 120 | 1000 |
| 26 | St Rev 2 | 1~4 | - | 5~6 | St Rev 1 | 300 | 150 | 2000 |

Fx...Effecter  St...Stereophonic  Mono...Mononaural
Thru...Bypass Through  Comp...Compressor  Dist...Distortion
EQ...Equalizer  Cho...Chorus  Rev...Reverb  Mix...Mode 3 Mixer

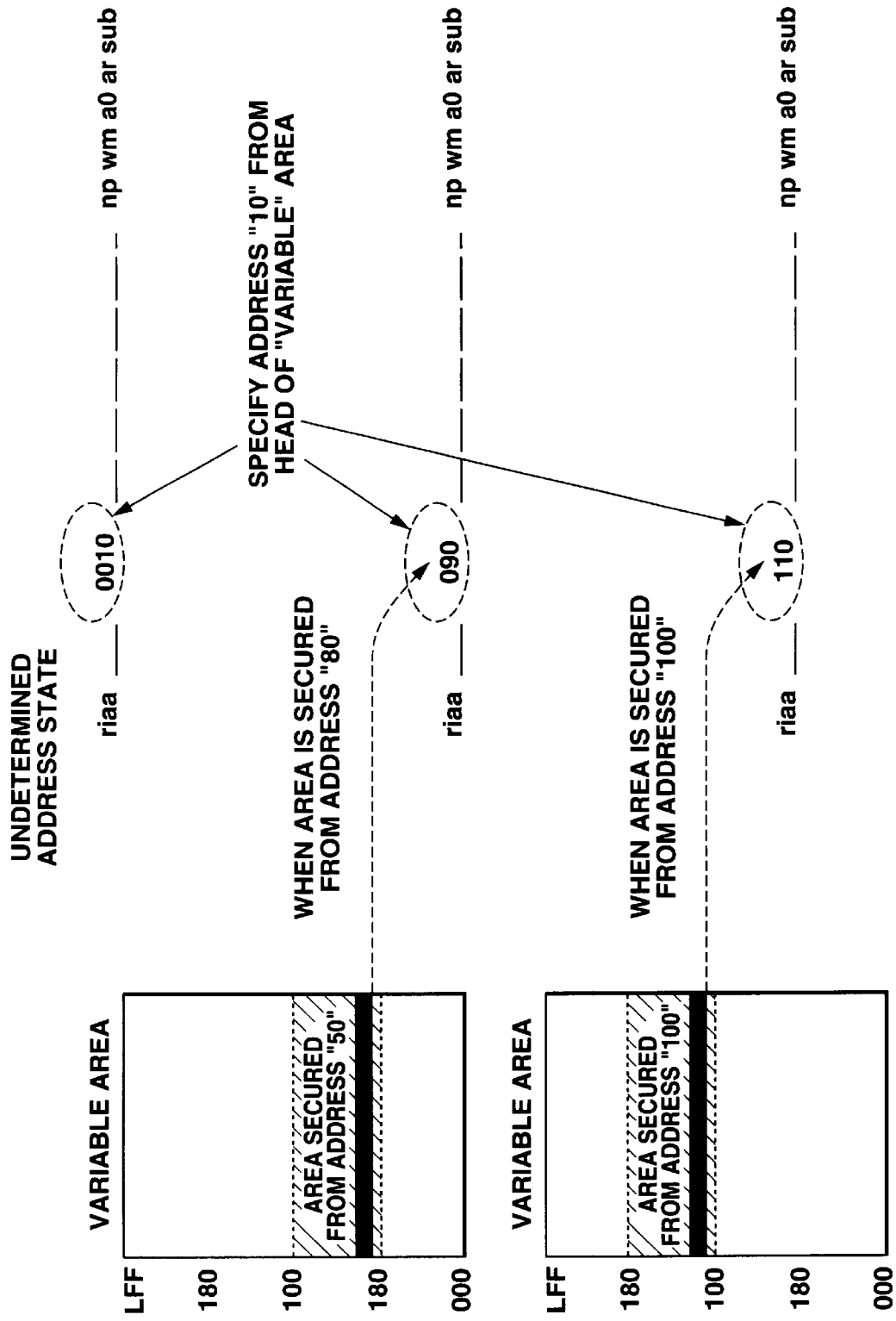

FIG.16

(a) PROGRAM DATA

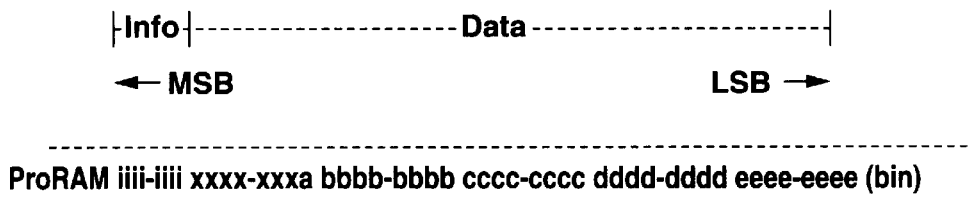

ProRAM iiii-iiii xxxx-xxxa bbbb-bbbb cccc-cccc dddd-dddd eeee-eeee (bin)

iiii-iiiiOperation 0000-0000  DATA FIELD VALUE IS NOT OPERATED ON 0001-0000  ADD HEAD ADDRESS OF SECURED PROGRAM RAM AREA TO DATA FIELD 0010-0000  ADD HEAD ADDRESS OF SECURED INTERNAL RAM AREA TO DATA FIELD 0100-0000  ADD HEAD ADDRESS OF SECURED EXTERNAL RAM AREA TO DATA FIELD

(b) INITIAL DATA

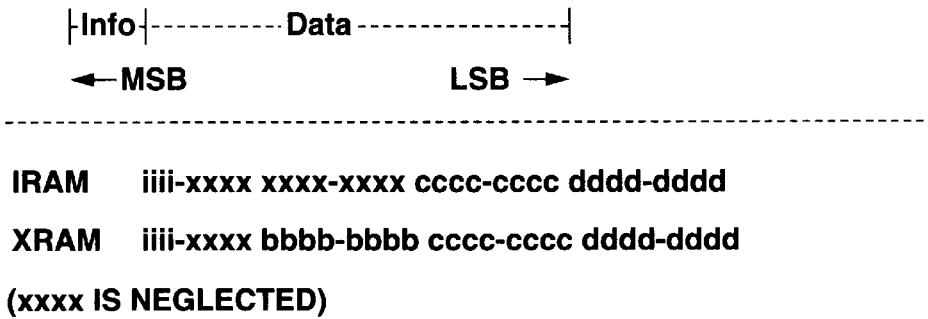

IRAM    iiii-xxxx xxxx-xxxx cccc-cccc dddd-dddd

XRAM    iiii-xxxx bbbb-bbbb cccc-cccc dddd-dddd (xxxx IS NEGLECTED)

iiii-xxxx   Operation

SIMILAR TO OPERATION ON PROGRAM WHEN xxxx=0

FIG.17

| KIND OF INFORMATION | VARIABLE NAME |
|---|---|
| NUMBER OF EFFECTER PARTS | FxPrtNum [ResPrt] |
| PROGRAM ALLOCATION | ProgAsgn [ResPrt] = {160, 160, 160} |
| UNUSED QUANTITY OF PROGRAM | ProSp [ResPrt] |
| INTERNAL RAM ALLOCATION | IramAsgn [ResPrt] = {84, 84, 84} |
| UNUSED QUANTITY OF INTERNAL RAM | IramSp [ResPrt] |
| EXTERNAL RAM ALLOCATION | XramAsgn [ResPrt] = {800, 800, 2496} |
| UNUSED QUANTITY OF EXTERNAL RAM | XramSp [ResPrt] |

※ Res Prt ... RESOURCE PART NUMBER

FIG.18

| KIND OF INFORMATION | VARIABLE NAME |
|---|---|
| LOAD EFFECTER No. | Fx[ResPrt][FxPrt] |
| PROGRAM HEAD | ProgTop[ResPrt][FxPrt] |
| INTERNAL RAM HEAD | IramTop[ResPrt][FxPrt] |
| EXTERNAL RAM HEAD | XramTop[ResPrt][FxPrt] |

※ Res Prt ... RESOURCE PART, FxPrt...EFFECTER PART NUMBER

APPARATUS FOR MANAGING RESOURCES OF A SIGNAL PROCESSOR, A RESOURCE MANAGING PROGRAM TRANSFERRING METHOD AND RECORDING MEDIUM

TECHNICAL FIELD

The present invention relates to techniques for managing resources which signal processors such as digital signal processor (DSP) which receive and execute a moduled program use.

BACKGROUND ART

The signal processors each employ a circuit composition for repeating an operation at high speeds, so that their operational speeds are greatly improved compared to general-purpose microprocessors, and are widely used for communication, and voice and image processing by utilizing their high speed operations. In a field of audio (music), the digital processors draw attention as apparatus for realizing various sound sources and acoustic effects, which create an atmosphere in which the audience feels as if they were in a concert hall or theater based on, reflected musical sounds (echoes).

The signal processors each execute a required program to obtain an expected process. When the use of the program is predetermined, it can be stored beforehand, for example, in a ROM provided in the processor. Most of the signal processors, however, receive a program transferred externally, store it in a RAM, and then executes it in order that the signal processor can perform various operations depending on the situation by changing the transferred program.

The signal processor is often caused to effect a plurality of different functions. For example, when the signal processor is used to add acoustic effects to a musical sound, various acoustic effects such as compressor, distortion or chorus can be added individually to the musical sound, and some of them can often be added simultaneously to the musical sound.

Such a combination of functions (in the above example, a combination of acoustic effects) is required to be considered. Thus, if a program is prepared for the contents of each possible processing (each combination of acoustic effects), the total number of programs required would be immense. In order to avoid this, there are two measures: one is to prepare a program to execute a selected part of the contents of a possible process, and the other is to prepare a program moduled so as to realize a particular function. However, in the former method, the number of combinations of functions realized by the prepared program is limited and the number of user's choices is limited. Thus, when it is important to increase the number of user's choices, the latter method is often employed. In the latter method, by the changing the number and kinds of programs to be transferred, the signal processor is capable of realizing not only one function but also various high general-purpose functions, and the number of programs to be prepared is reduced, advantageously.

The program is generally arranged to perform some operation on input target data, and then outputs the result of the processing. As well known, resources such as storage devices from and to which data is read and input, and storage devices to and from which the processed data is stored and output are used in the execution of the program are beforehand defined in the program. The kinds of programs to be executed and a sequence of execution of the programs change depending on the situation. This implies that a location where data processed by a next program is stored changes depending on a program executed last. Thus, conventionally, an auxiliary program which effects transfer of data between programs, that is, a program for transferring data written in a particular area by executing a program to an area where a next program reads the data is prepared (other programs can be hereinafter referred to as a functional program). Thus, the functional and auxiliary programs are conventionally transferred to the signal processor, for example, as follows.

The programs to be transferred to the signal processor are generally stored in a non-volatile recording medium such as a ROM or a magnetic disk. A controller which transfers programs to a signal processor such as a CPU specifies a functional program to be transferred based on the contents of processing which the signal processor effects, and an auxiliary program which effects transfer of data between functional programs which are executed in an undetermined sequence based on the kinds of the functional programs. The controller reads out from the storage medium the functional and auxiliary programs specified so, and transfers them to the signal processor in the order in which the auxiliary program intervenes between the functional programs in order that the signal processor sequentially executes the functional and auxiliary programs in that order to transfer data between the functional programs.

Since the kinds and order of execution of the functional programs cannot be determined beforehand, resources (areas) to be used in execution of the respective functional programs are defined so as not to erase the results of processing of other functional programs. It is defined that a different resource is used for each functional program. In the past, a large amount of memory is prepared as a resource usable for the signal processor to execute functional programs which use different resources.

However, when execution of a functional program has been completed, the resource (area in a memory) used is not generally used after the data written in the area is read out. In the past, the large amount of memory for the signal processor is prepared to insure an area to be used temporarily. Thus, most of usable resources are often used uselessly and the efficiency of use of the resources is low, undesirably.

In the past, an auxiliary program is prepared for transferring data between functional programs, as described above. The auxiliary program is transferred to the signal processor and stored in its memory. Thus, the signal processor must have a large capacity of memory so as to store the auxiliary program, which would lead to an increase in the manufacturing cost of the signal processor and an increase in a load on the signal processor. Therefore, the above-mentioned problems, which are liable to occur when the signal processor is desired to maintain high versatility, are strongly desired to be solved.

DISCLOSURE OF THE INVENTION

It is therefor an object of the present invention to cause a signal processor to maintain high versatility and to improve the efficiency of use of resources which the signal processor requires.

According to one aspect of the present invention, there is provided a resource managing apparatus for a signal processor, the apparatus managing a storage area of first storage means of the signal processor which stores a plurality of programs each of which controls a process executed by the signal processor, the apparatus comprising:

program reading means for reading out a program to be transferred to the first storage means of the signal processor from second storage means which contains a plurality of types of programs;

instruction changing means for changing the contents of a particular one of instructions which composes the program read out by the program reading means; and transferring means for transferring the program composed by the instructions which include the particular instruction whose contents were changed by the instruction changing means to a specified storage area of the first storage means.

According to another aspect of the present invention, there is provided a resource managing apparatus for a signal processor for managing a storage area of first storage means of the signal processor which contains a plurality of programs each of which controls a process executed by the signal processor, the apparatus comprising:

program specifying means for specifying one of a plurality of programs stored in the first storage means;

program reading means for reading out a program to be transferred to the first storage means of the signal processor from second storage means which contains a plurality of types of programs;

first instruction changing means for changing the contents of an instruction of the program read out by the program reading means so as to be allocated to the storage area of the first storage means allocated to the program specified by the program specifying means; and transferring means for transferring the program which involves the instruction whose contents are changed by the instruction changing means to the storage area of the first storage means allocated to the program specified by the program specifying means.

According to this construction, when a program to be transferred to the signal processor is determined, the contents of a particular one of the instructions which composes the program are changed and transferred to the signal processor to manage the storage area of a memory which the signal processor uses in the execution of the respective programs. Thus, the storage area of the same memory is used at least to transfer and store data between the programs. Thus, the memory is used effectively and the signal processor can execute the program, using a reduced memory capacity.

Similarly, the present invention provides a method of managing resources for the signal processors and a program, which manages resources for the signal processor, using a computer.

BRIEF DESCRIPTION OF THE DRAWINGS

FIG. 14 illustrates the contents of resource information in the third embodiment;

FIG. 15 illustrates changing a program for an insured resource m the third embodiment, FIG. 16 illustrates the forms of program data and initial data in the third embodiment;

FIG. 17 illustrates variables for managing resources for the signal processor in the third embodiment (part 1);

FIG. 18 illustrates variables for managing resources for the signal processor in the third embodiment (part 2)

DESCRIPTION OF THE PREFERRED EMBODIMENTS

Preferred embodiments of the present invention will be described next in more detail with reference to the comparing drawings.

First Embodiment

Figure 1:
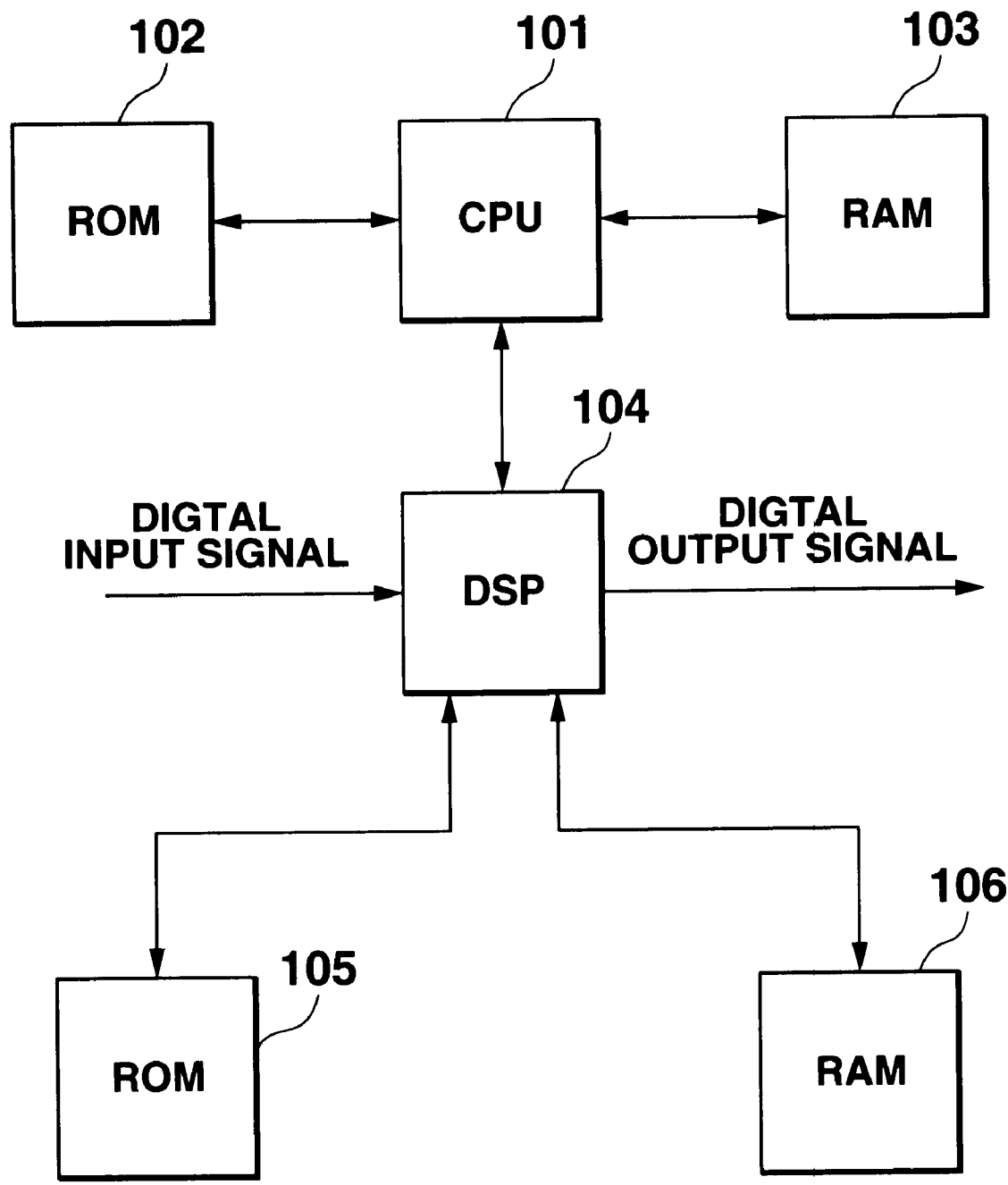
FIG. 1 is a schematic of a system, which includes an apparatus for managing resources for a signal processor as a first embodiment of the present invention.

FIG. 1 is a schematic of a system which includes an apparatus for managing resources for a signal processor as a first embodiment of the present invention. As shown in FIG. 1, the system comprises a CPU 101 which controls the whole system, a ROM 102 which stores programs executed and transferred by the CPU 101, and various control data, a RAM 103 which the CPU 101 uses as a working area, a signal processor (DSP) which executes a program transferred from the CPU 101, a ROM 105 which contains data referred to by the DSP 104, and a RAM 106 which the DSP 104 uses as a working area. In this system, the CPU 101, ROM 102 and RAM 103 realize the resource managing apparatus. The ROM 105 and RAM 106 are external memories, which the DSP 104 accesses, and may be hermetically sealed in the same package as the DSP 104.

It is assumed for convenience'sake that the system of FIG. 1 composes a part of an electronic musical instrument and that the DSP 104 receives a digital signal which includes musical sound waveform data output from a sound source (not shown), adds acoustic effects specified by a user to the waveform data, and then outputs a corresponding output signal.

In operation, the CPU 101 reads out and executes a required program stored in the ROM 102 to control the whole system. The CPU 101 is connected to various switches (not shown) which include switches with which a user specifies acoustic effects. The CPU 101, for example, scans the various switches at predetermined intervals of time, analyzes the result of the scan, and recognizes the contents of input specified by the user with the switches. When the CPU 101 recognizes based on the analysis of the result of the scan that the user has instructed the CPU 101 to change an acoustic effect to be added to a musical sound, the CPU 101 reads out a program to be executed newly from the ROM 102, transfers it, and sets a new acoustic effect for the DSP 104.

Figure 2:
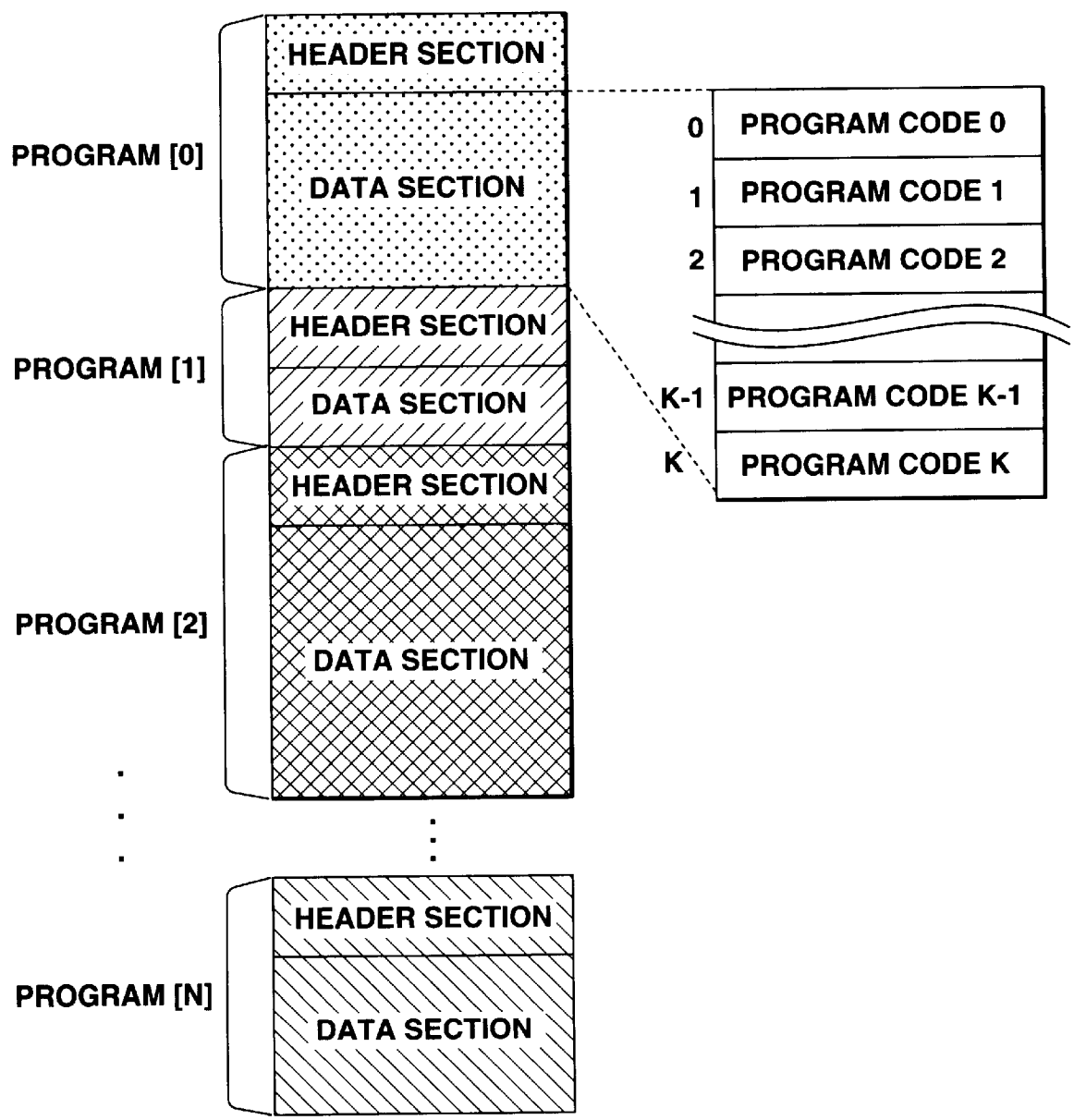
FIG. 2 illustrates a data composition of a program stored in a ROM.

FIG. 2 illustrates a data composition of a program stored in the ROM 102. In FIG. 2, numbers "0"–"n" are allocated to the programs in correspondence to acoustic effects. Each program is for realizing a single type of acoustic effect. The program is composed of a header and a data section. The header section contains various control data such as a length of the data section (the number of instructions) and the number of bytes of one instruction. The data section contains a program proper or a series of instructions composing the program. "Program codes" with "0"–"k" each represents an instruction. The numerals "0"–"k" appearing outside the program code areas each represent an address which indicates a location in the data section where an instruction is stored. In order to discriminate a program to be transferred to the DSP 104 from a program executed by the CPU 101, the former program is hereinafter referred to as a DSP program.

Resources (herein, an area in the RAM 106) to be used in the execution of each of the DSP programs stored in the ROM 102 are defined in the DSP program such that resources to be used for inputting/outputting purposes differ for each program, which causes the resources to be used uselessly to reduce the efficiency of use of them.

Figure 3:
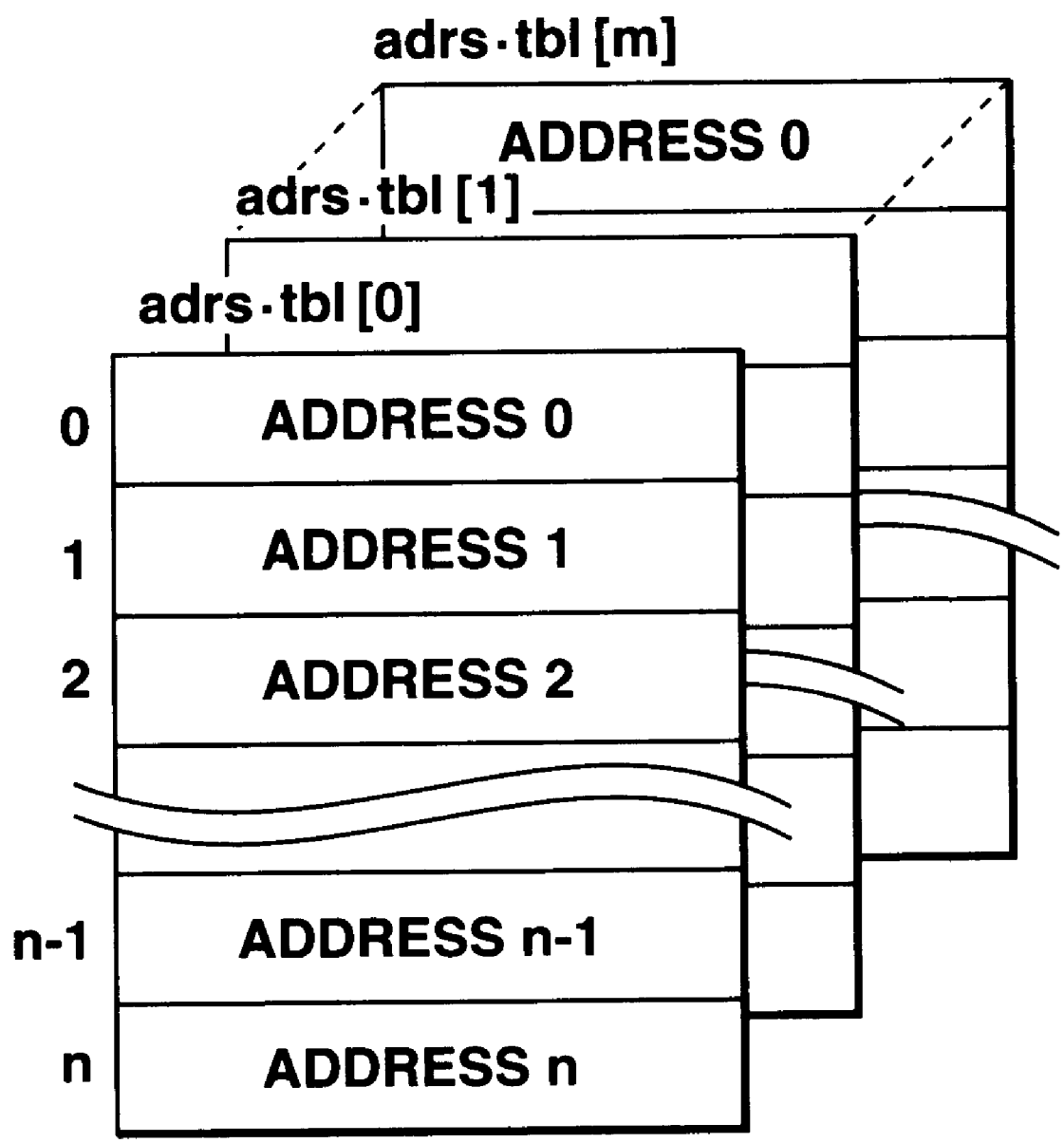
FIG. 3 illustrates a data composition of a program address table.
Figure 4:
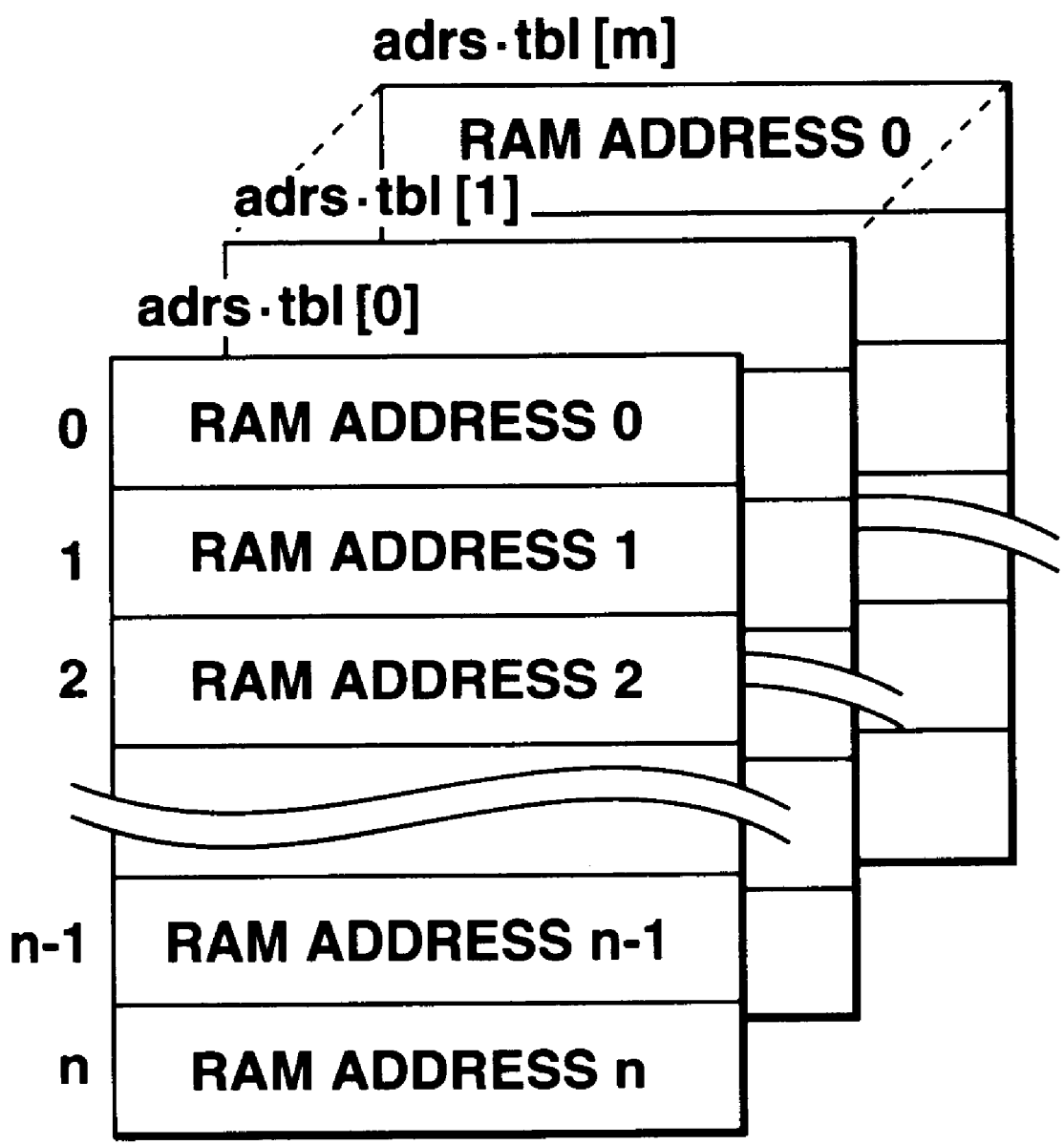
FIG. 4 illustrates a data composition of a DSP RAM address table.

The user determines the sequence in which the DSP programs stored in the ROM 102 are executed. When the user determines the sequence, the CPU 101 reads out from the ROM 102 DSP programs to be executed, and transfers them to the DSP 104. Thus, when the programs are transferred to the DSP 104, the CPU 101 operates on an instruction involving the use of the resources among the instructions which compose the program on the basis of the determined sequence to thereby suppress wasteful consumption of the resources. Referring to FIGS. 3 and 4, management of the resources of the DSP 104 which the CPU 101 effects based on the operation of the instruction will be described in detail next.

Although not shown, each instruction is composed of an instruction section where an instruction code is stored which includes an identifier indicative of the contents of the instruction (operation) and an address section where information is stored which specifies data subjecting to the operation specified by the instruction code.

An instruction to read data specified by the information stored in the address section (hereinafter referred to as a load instruction) and an instruction to store data at a location specified by the information stored in the address section (hereinafter referred to as a store instruction) involve the resources used as well as transfer of data between the DSP programs. Thus, in the present embodiment, the contents of the address section of each of those instructions (hereinafter referred to as an access instruction collectively, for convenience's sake) are operated on, data is transferred between the programs, and the resources to be used are reduced as a whole.

The access instruction which involves operation on the address section is specified by the CPU which refers to a table which contains an address in which the access instruction is stored (program address table). The address includes data, which represents a location where each instruction unit is stored, with a head of the data section as a reference. The table is stored in the ROM 102 for controlling purposes.

In order to transfer data between DSP programs, or in order to cause an area where data is written by a DSP program executed first to coincide with an area where data is read out by a DSP program executed next, there are two methods: One is to change the position of the area where data is written without changing the area where data is read out, and the other is to change the position of the area where data is read out without changing the area where data is written.

The present embodiment basically employs the latter method. Thus, there are prepared a plurality of program address tables for each program. They include ones for which there are no programs to be executed before a particular program and ones for which there are programs to be possibly executed before the particular program to thereby refer to a program address table specified based on the particular program to be executed and programs executed before the particular program is executed. Of course, the former method may be employed or a combination of the former and latter may be used.

FIG. 3 illustrates the data composition of the program address tables prepared for a DSP program in the ROM 102. Array variables "adrs·tbl [0]"–"adrs·tbl[m]" of FIG. 3 are prepared, for example, for each DSP program. Each of the elements (addresses) of each table contains a head address in the ROM 102 to access a corresponding table. The numerals "0"–"n" outside the corresponding address frames each represent an address on the table where an address is stored which represents a storage location of an instruction whose contents should be changed is stored, with the head of the data section as a reference. For example, by substituting a numeral allocated to the DSP program executed last into square brackets of the array variable concerned, the CPU 101 acquires and refers to a head address in an area where the table to be referred to is stored. Thus, the CPU 101 operates on an address section of an access instruction defined as being operated on the program address table. Addresses on each program address table are each hereinafter referred to as an offset to discriminate it from others.

The CPU 101 operates on the address section by referring to a table which defines the contents of its operation based on a program to be executed and another program executed immediately before the former program. Since only the RAM 106 is an object on which the DSP 104 can write data, the table contains addresses in the RAM 106. The table is hereinafter referred to as a DSP RAM address table.

Like the plurality of program address tables, there are prepared for each DSP program a plurality of such DSP RAM address tables in the ROM 102 for DSP programs to be possibly executed next to that program to thereby refer to a DSP RAM address table specified based on a DSP program to be executed and DSP programs executed immediately before the former program is executed.

FIG. 4 schematically illustrates the data composition of the DSP RAM address tables prepared for a program in the ROM 102. Like the array variables adrs·tbl [0]–adrs·tbl[m] of FIG. 3, array variables adrs·tbl [0]–adrs·tbl[m] of FIG. 4 are prepared, for example, for each DSP program. Each of the elements contains a head address in the ROM 102 to access a corresponding table. The numeral "0"–"n" outside the corresponding address frames each represent an address on the table where a corresponding address in the RAM 106 is stored. For example, by substituting a numeral allocated to the DSP program executed last into square brackets of the array variable concerned, the CPU 101 acquires and refers to a head address in an area where the table to be referred to is stored. Thus, the CPU 101 changes an address stored in an address section of an access instruction defined as being operated on the program address table to the address defined in the DSP RAM address table. Addresses on each DSP RAM address table indicating storage locations of addresses in the RAM 106 are each hereinafter referred to as an offset.

As described above, the DSP program proper, data is operated on and then transferred between the programs without causing the DSP 104 to execute a program, which transfers the data between the programs. The resources, which the DSP 104 uses, are managed in units of a DSP program, and the DSP 104 uses the same resource between the DSP programs whose executions are not necessarily predetermined. Thus, the resources used in the execution of the programs (herein, the areas used actually in the RAM 106) are reduced to thereby improve the efficiency of use of the resources. Thus, a required capacity of the RAM 106 is reduced and the costs of the DSP 104 and hence the system are reduced.

Since the CPU 101 is not required to transfer a program which transfers data to the DSP 104, the number and areas of resources usable can be increased and the load on the DSP 104 can be reduced, advantageously. Thus, the number of functions realizable by the DSP 104 (herein, acoustic effects added to a musical sound) can be increased.

Figure 5:
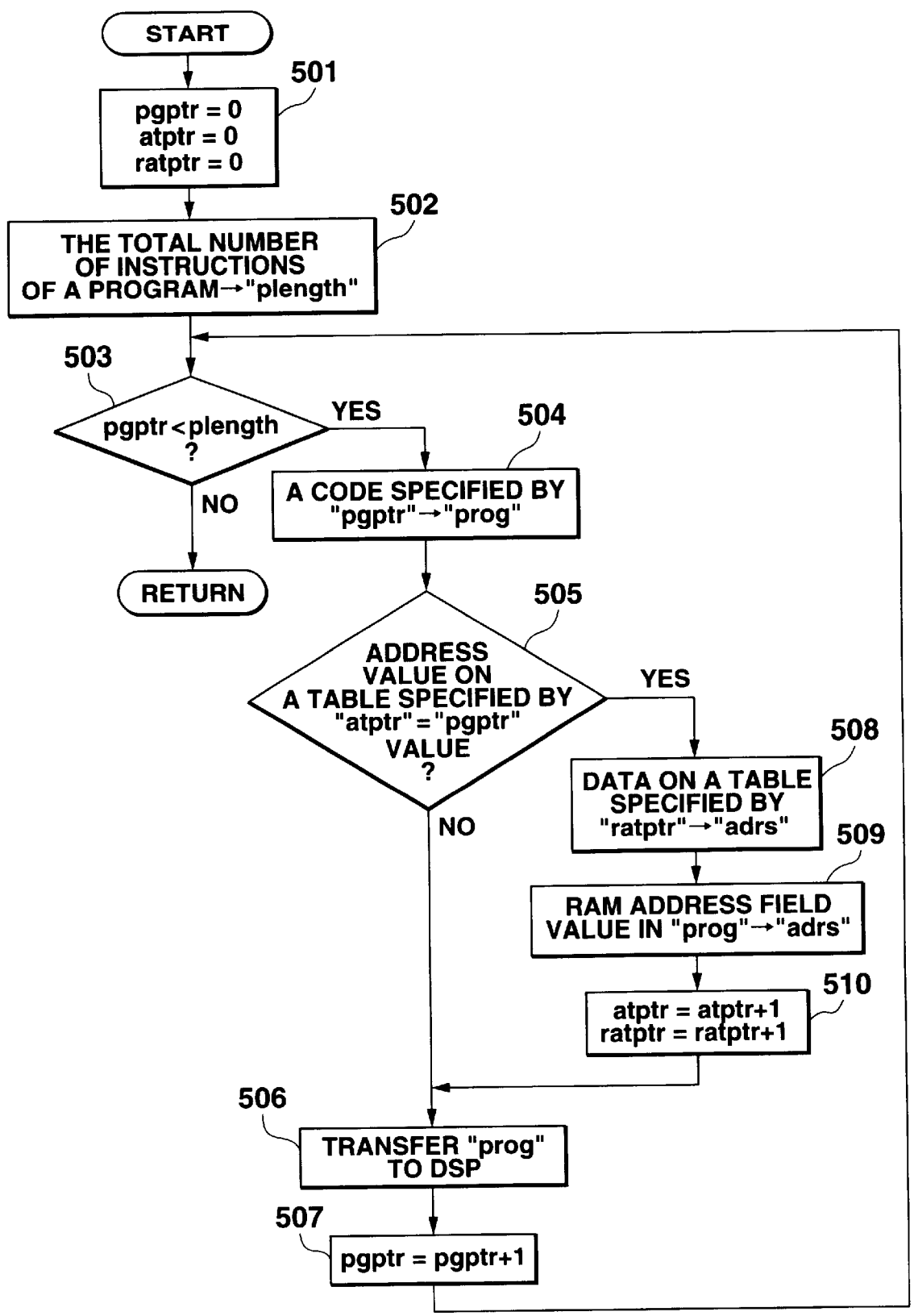
FIG. 5 is a flowchart of a program transfer process.

Transfer of a program by the CPU 101 will be described in detail with reference to FIG. 5, which is a flowchart of a DSP program transfer process. The transfer of the DSP program is effected by referring to the program address table and DSP RAM address table specified by the kind of a DSP program executed immediately before the transfer of the former DSP program. What is to be transferred is a program proper stored in the data section (FIG. 2).

When the user instructs the system to change the kinds or number of acoustic effects to be added to a musical sound, a corresponding DSP program is required to be transferred to the DSP 104. The CPU 101 effects the transfer of the program by executing a corresponding program stored in the ROM 102.

First, in step 501 the CPU 101 substitutes initial values into the respective variables. More specifically, the CPU 101 substitutes zeros into a variable "pgptr" for managing instructions of a program to be transferred to the DSP 104, a variable "arptr" for managing a location to be referred to on the program address table, and a variable "ratptr" for managing a location to be referred on the DSP RAM address table. In step 502, the CPU 101 reads out the total number of instructions of the program to be transferred from the header section and substitutes it to a variable "plength".

Then, the CPU 101 shifts its control to step 503. In the step 503 and subsequent steps, the CPU 101 increments the value of the variable "pgptr", reads out from the ROM 102 an instruction specified by the value of the variable "pgptr" and effects a process to transfer the instructions to the DSP 104. The contents of the instruction whose contents are determined as being changed on the basis of the program address table among the instructions read out from the ROM 102 are changed, using a corresponding address stored in the DSP RAM address table, and the resulting instructions are then transferred.

First in step 503, the CPU 101 determines whether the value of the variable "pgptr" is smaller than the value of the variable "plength". When all the instructions which compose the program to be transferred are transferred to the DSP 104, the values of those variables become equal. Thus, when the required program has been transferred, the determination becomes NO in step 503 and the CPU 101 then terminates the process. If otherwise, the determination becomes YES and the CPU 101 then shifts its control to step 504.

In step 504, the CPU 101 reads out from the ROM 102 an instruction (code) of the data section specified by the value of the variable "pgptr", and substitutes it into a variable "prog". Then, in step 505 the CPU 101 determines whether the value of an address stored in a location on the program address table specified by the variable "atptr" is equal to the value of the variable "pgptr". When the CPU 101 has substituted an instruction defined as being changed on the program address table into the variable "prog" in step 504, the determination becomes YES and the CPU 101 then shifts its control to step 508. If otherwise, the determination becomes NO, and the CPU 101 then shifts its control to step 506.

In step 506, the CPU 101 transfers the instruction substituted into the variable "prog" to the DSP 104. Then, in step 507 the CPU 101 increments the value of the variable "pgptr". Then, the CPU 101 returns its control to step 503.

In step 508, the CPU 101 reads out from the ROM 102 data (address in the RAM 106) stored at a location on the DSP RAM address table specified by the value of the variable "ratptr", and then substitutes it into a variable "adrs". Then, in step 509 the CPU 101 rewrites the address of the address section in the variable "prog" with the address substituted into the variable "adrs". Thus, by executing the instruction substituted into the variable "prog", the CPU 101 changes an address at which the DSP 104 reads out data from the RAM 106. Then, in step 510 the CPU 101 increments the respective values of the variables "atptr" and "ratptr", and then shifts its control to step 506, where it transfers to the DSP 104 the instruction whose contents are changed and substituted into the variable "prog".

As described above, in the present embodiment the CPU 101 changes the contents of the instruction and then transfers the resulting DSP program. While effecting this process for each DSP program, the CPU 101 manages resources usable by the DSP 104 so as to be usable effectively.

While in the present embodiment the contents of load instructions are illustrated as being changed, the contents of instructions other than the load and store instructions may be changed. Some of the load instructions each read out data based on the result of execution of another instruction. Thus, an instruction related to execution of an access instruction may be changed.

Second Embodiment

In the first embodiment, the CPU detects an instruction (code) to change the contents of a DSP program by referring to the program address table prepared for detection of the instruction. In the second embodiment, the CPU detects an instruction to change its contents only by referring to a relevant DSP program without preparing a program address table separately.

A system, which includes a resource managing apparatus in the second embodiment, is basically the same in construction as the first embodiment. Thus, the reference numerals used in the description of the first embodiment are used to describe elements of the second embodiment different from the first embodiment.

As shown in FIG. 2, a DSP program includes a header section and a data section. In the second embodiment, the header section contains a code of an instruction whose contents should be changed. Thus, the instruction, for example a load instruction, can be detected.

In that case, since the instruction can be detected only by comparing the instruction code in the data section with that in the header section, it can easily detected compared to the first embodiment. Since no program address tables are required to be prepared, corresponding areas of the ROM 102 can be used for other uses to thereby realize much more functions.

The address section of the instruction stores an offset value in the DSP RAM address table instead of the address stored as in the above example, i.e. data indicative of a location where an address of the RAM 106 to be stored in the address section in the DSP RAM address table is stored. By referring to the contents of the DSP program, the CPU 101 can specify an instruction whose contents should be changed, in addition to the contents of the instruction to be changed.

The DSP RAM address table is specified based on the kind of a DSP program to be processed and the kind of a DSP program to be executed before the former DSP program, as in the first embodiment.

The CPU 101 sequentially reads out required DSP programs in units of an instruction from the ROM 102 and then transfers them to the DSP 104. An instruction whose contents should be changed among the instructions read out from the ROM 102 is detected by comparison of a code stored in the instruction section with an instruction code stored in the header section. The CPU 101 fetches an offset value stored in the address section of the detected instruction instead of the address, and stores in the address section instead of the offset value an address in the RAM 106 on the DSP RAM address table specified by the offset value. Then, by transferring to the DSP 104 the DSP program where the contents of the instruction are thus changed, the resources which the DSP 104 uses are managed depending on the DSP program to be transferred to the DSP 104.

Figure 6:
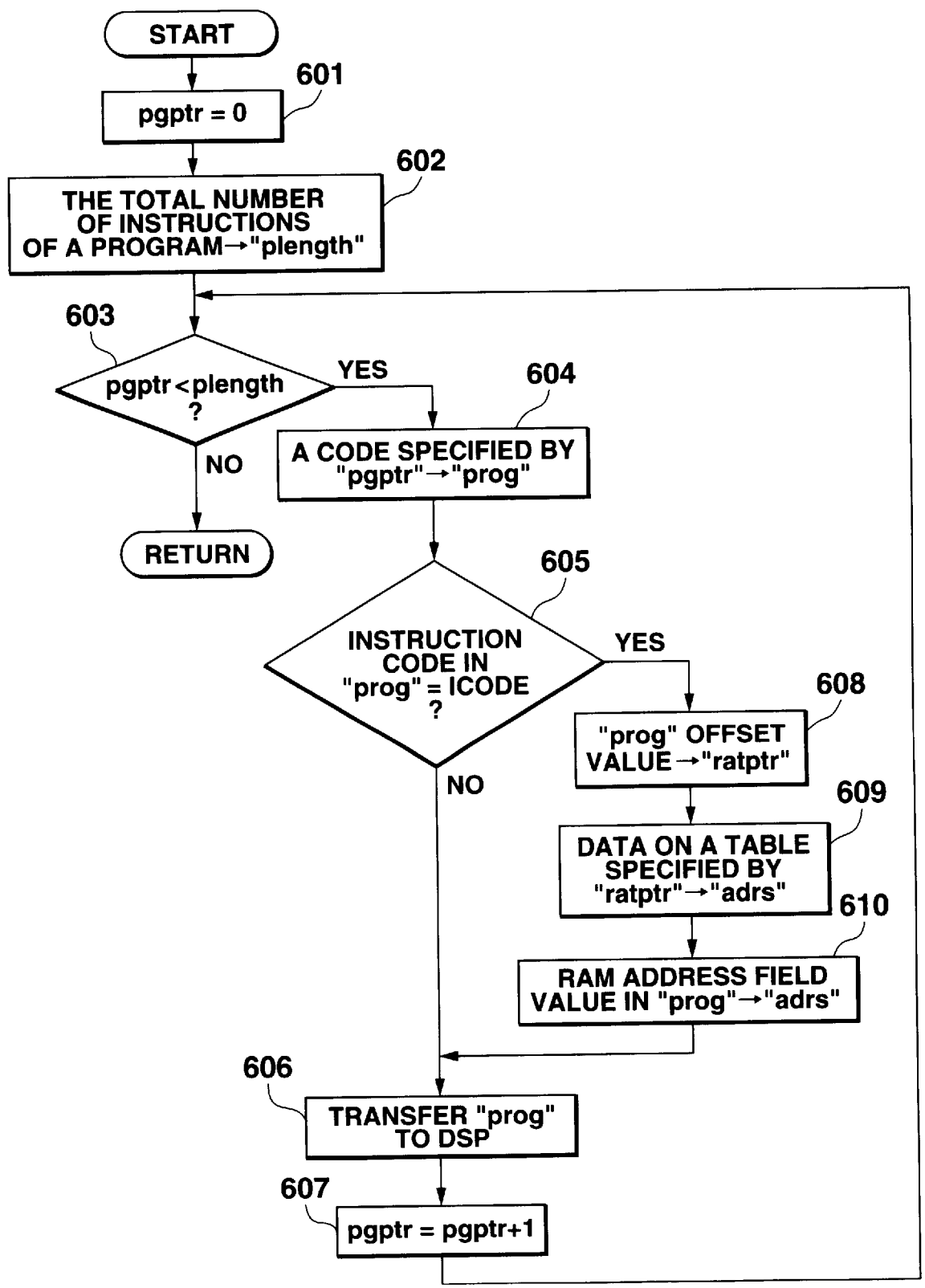
FIG. 6 is a flowchart of a program transfer process in a second embodiment.

Referring to FIG. 6, the transfer of the program by the CPU 101 will be described in detail. FIG. 6 is a flowchart of the program transfer process which represents a flow of transfer of a DSP program, for convenience's sake.

The CPU 101 effects the transfer of the DSP program by referring to a DSP RAM address table specified from the kind of a DSP program executed before the former DSP program. What is to be transferred is only the program proper stored in the data section (FIG. 2).

When the user instructs the system to change the kinds or number of acoustic effects to be added to a musical sound, the DSP program is required to be transferred to the DSP 104, which the CPU 101 realizes by executing a corresponding program stored in the ROM 102.

First in step 601, the CPU 101 substitutes zero into the variable "pgptr" for managing an instruction in the program to be transferred to the DSP 104. Then, in step 602 the CPU 101 reads out the total number of instructions of a program to be transferred from the header section, and then substitutes it into a variable "plength". In addition, the CPU 101 reads out from the header section a code of an instruction whose contents are to be changed and then substitutes it into a variable "ICODE".

Then in step 603 and subsequent steps, the CPU 101 increments the value of the variable "pgptr" while reading out from the ROM 102 an instruction specified by the value of the variable "pgptr" and then performs a process for transferring it to the DSP 104. The contents of the instruction whose contents were determined as being changed among the instructions read out from the ROM 102 are changed, using an address stored in the DSP RAM address table, and then transferred.

First, in step 603 the CPU 101 determines whether the value of the variable "pgptr" is smaller than that of the variable "plength". When all the instructions which compose the program to be transferred are transferred to the DSP 104, the values of those variables become equal. Thus, when transfer of the program to be transferred has been completed, the determination becomes NO and then the CPU 101 terminates the process. If otherwise, the determination becomes YES.

Then, the CPU 101 then shifts its control to step 604, where the CPU 101 reads out from the ROM 102 an instruction (code) of the data section specified by the value of the variable "pgptr", and substitutes it into a variable "prog". CPU 101 then shifts its control to step 605, where it determines whether the code of the instruction substituted into the variable "prog" is equal to the code of the instruction substituted into the variable "ICODE". When the instruction having the instruction code stored in the header section is substituted into the variable "prog" in step 604, the determination becomes YES and the CPU 101 then shifts its control to step 608. If otherwise, the determination becomes NO.

The CPU 101 then shifts its control to step 606, where the CPU 101 transfers the instruction substituted into the variable "prog" to the DSP 104. Then, in step 607 the CPU 101 increments the value of the variable "pgptr", and then returns its control to step 603.

In step 608, the CPU 101 fetches from the variable "prog" an offset value of the address section which composes a part of the instruction substituted into the variable "prog", and then substitutes it into a variable "ratptr". Then in step 609, the CPU 101 reads out from the ROM 102 data (address) stored at a location in the DSP RAM address table specified by a value of the variable "ratptr", and then substitutes it into a variable "adrs". Then, in step 609 the CPU 101 rewrites the offset value of the address section of the variable "prog" with the address substituted into the variable "adrs". Thus, by executing the instruction substituted into the variable "prog", the CPU 101 changes an address at which the DSP 104 reads out data from the RAM 106. Then, in step 606 the CPU 101 transfers to the DSP 104 the instruction whose contents have been changed and substituted into the variable "prog".

While in the second embodiment the method of detecting an instruction whose contents are to be changed and the method of specifying the contents of the instruction are illustrated as being different from those in the first embodiment, one of them may be changed.

Third Embodiment

In the first and second embodiments, useless consumption of resources of the DSP is reduced by changing the contents of the instruction by paying attention to the transfer of data between the programs concerned. In contrast, in a third embodiment, a decrease in the degree of the user's satisfaction occurring due to insufficient resources is suppressed, in addition to a reduction in the wasteful consumption of the resources of the DSP.

Figure 7:
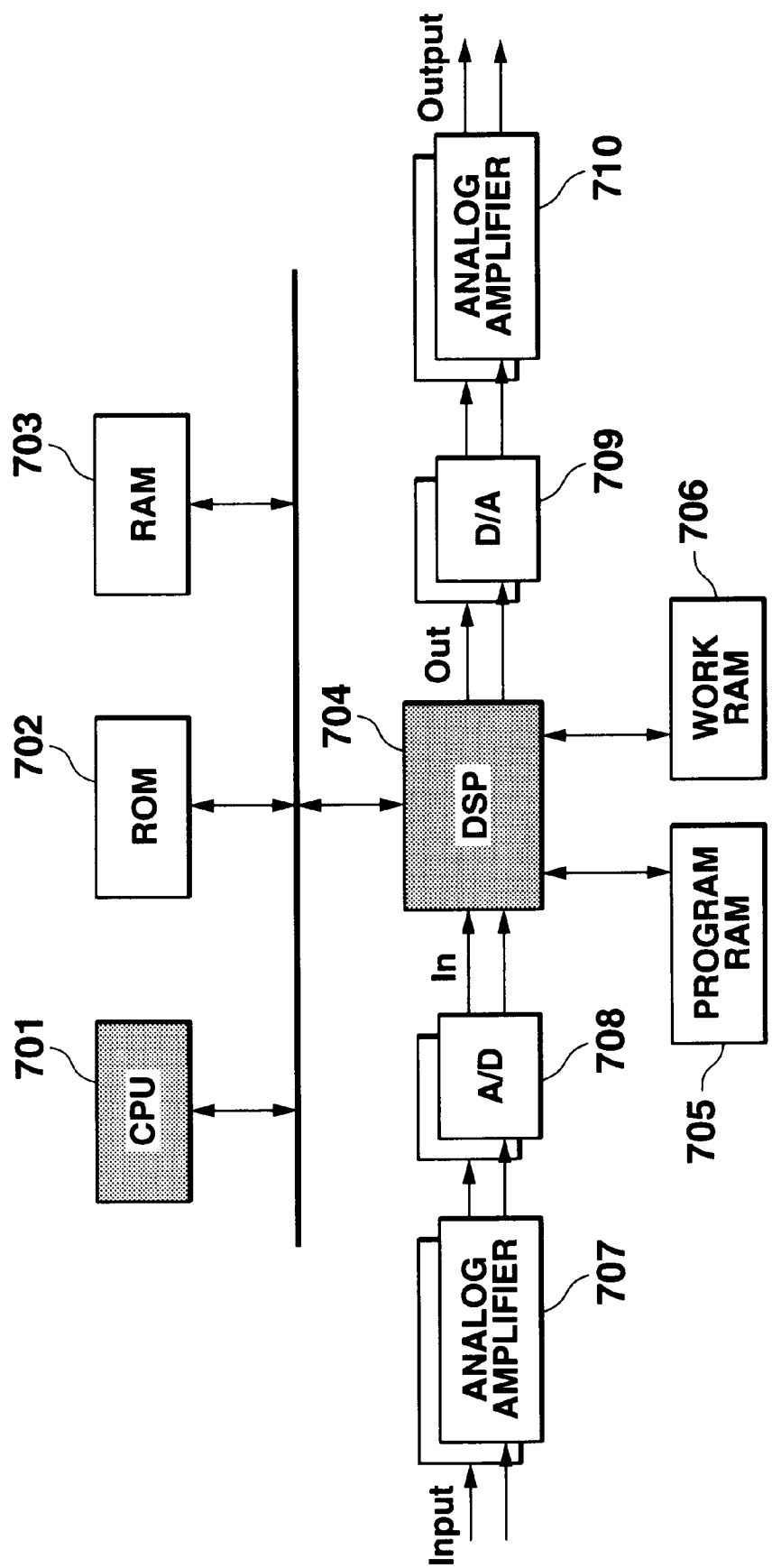
FIG. 7 is a schematic of a system which includes an apparatus for managing resources for a signal processor as a third embodiment.

FIG. 7 illustrates a system, which includes an apparatus for managing resources for a signal processor in the third embodiment. The system composes a part of an amplifier of an electronic musical instrument such as an electric guitar. As shown in FIG. 7, the system comprises a CPU 701 which provides control over the whole system; a ROM 702 which contains programs executed by the CPU 701, DSP programs to be transferred, and various control data; a RAM 703 which the CPU 701 uses for a working area; a DSP 704 which executes a DSP program transferred from the CPU 701; a program RAM 705 which stores the DSP program transferred from the CPU 701, and a work RAM 706 which the DSP 704 uses for a working area. The CPU 701, ROM 702 and RAM 703 realize the resource managing apparatus in the third embodiment. The RAMS 705 and 706 are external memories which the DSP 704 accesses, and may be hermetically sealed within the same package as the DSP 704.

The system of FIG. 7 includes a pair of channels for obtaining a stereophonic effect: each channel includes an analog amplifier 707 which amplifies an analog musical sound signal, for example, received from a pickup (not shown), an A-to-D converter 708 which converts the analog musical sound signal to a digital musical sound signal, the DSP 704 which is used as a common effecter which adds an acoustic effect to the digital waveform data, a D-to-A converter 709 which converts the digital waveform data to an analog musical sound signal (audio signal), and an analog amplifier 710 which amplifies the audio signal and then outputs it from the system.

Referring to FIGS. 8–18, management of resources of the DSP 704, i.e., transfer of the DSP program, by the CPU 701 will be described next.

Figure 8:
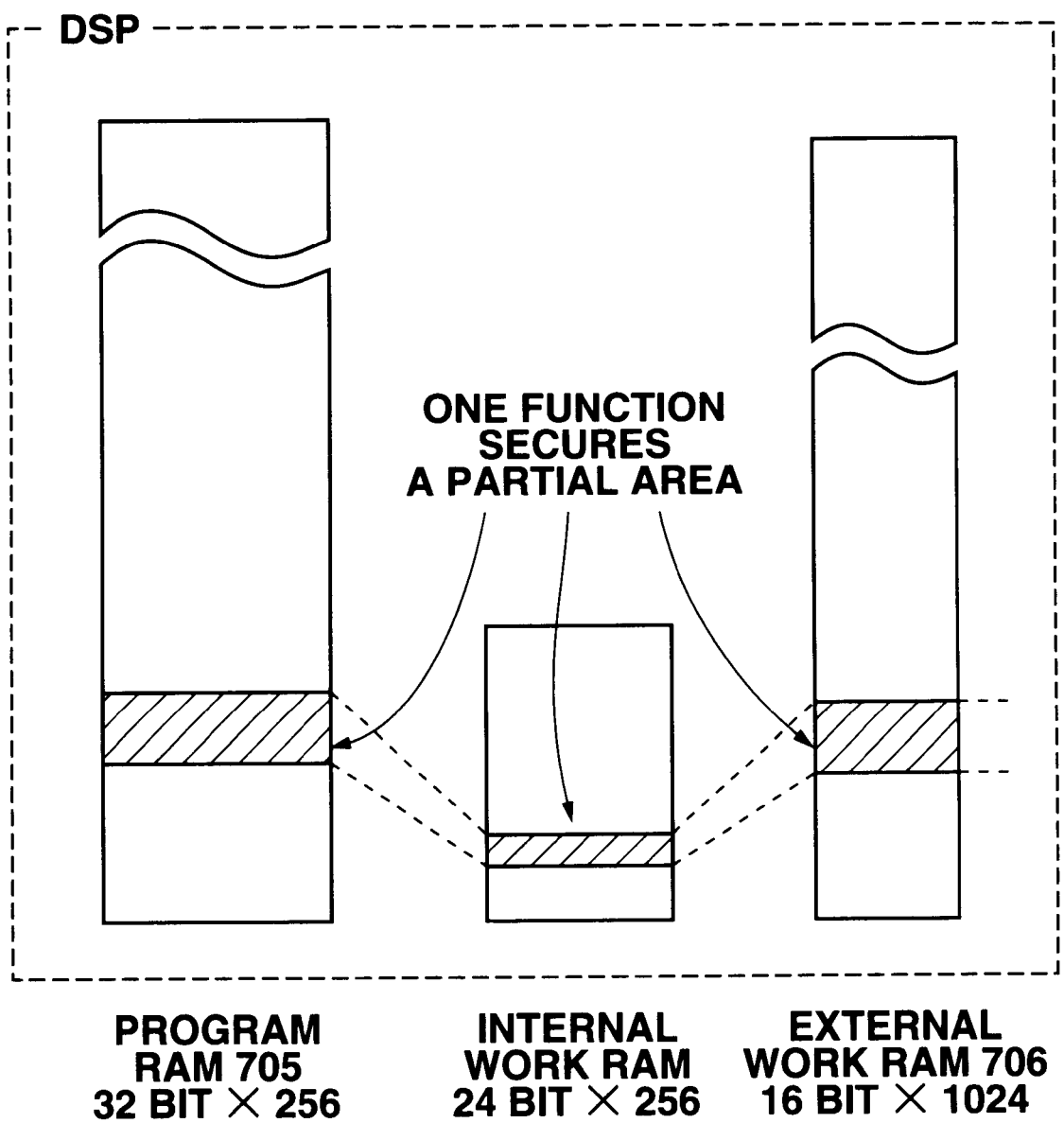
FIG. 8 illustrates resources usable for the signal processor in the third embodiment.

FIG. 8 illustrates resources usable for the DSP 704. As shown in FIG. 8, the DSP 704 whose resources are managed uses the program RAM 705, work RAM 706 and the work RAM which the DSP 704 has, as the resources to be managed. The work RAM, which the DSP 704 has, is hereinafter referred to as an internal work RAM, and the work RAM 706 as an external work RAM.

Figure 9:
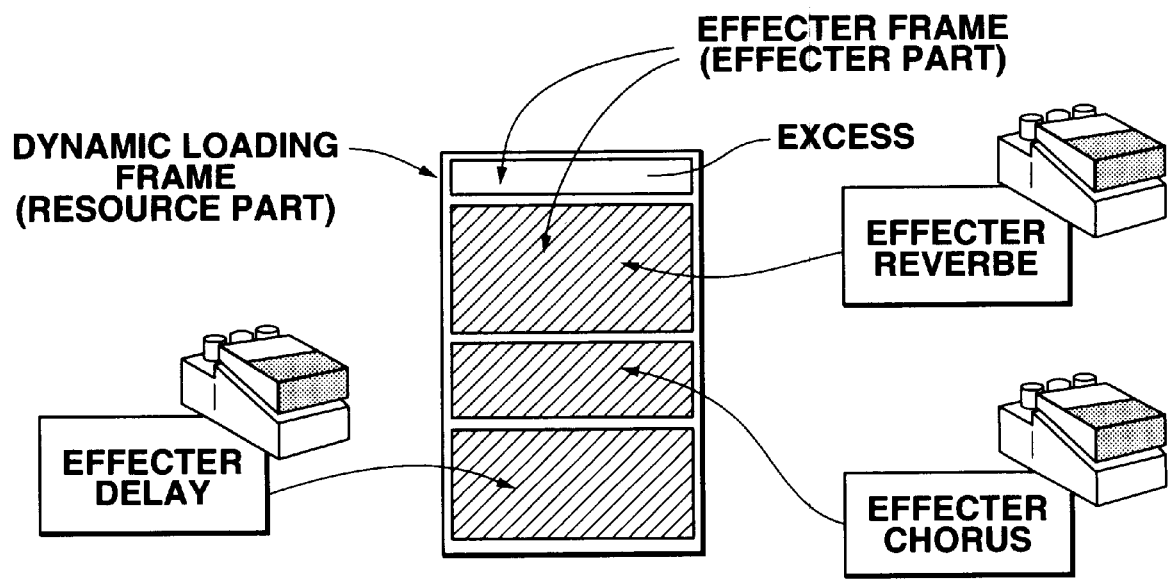
FIG. 9 illustrates allocation of resources of the signal processor m the third embodiment.

FIG. 9 illustrates a method of allocating the resources of the DSP 704 in the third embodiment. The respective areas of the three RAMS allocated actually to a DSP program change depending on the number and kinds of other DSP programs transferred to the DSP 704. The number of the DSP programs allocated at a time to the DSP 704 changes depending on the kinds of the DSP programs. Thus, the present embodiment employs a method of imaginary handling as a frame resources usable for the DSP 704, and allocating to the frame as many frames having sizes determined by the kinds of the DSP programs as possible. Thus, more acoustic effects are added to a musical sound while maintaining a freedom of selecting the acoustic effects at high value. Herein, the method is referred to as dynamic loading, a size of a resource usable for the DSP 704 is referred to as a resource part, and a capacity of each of necessary resources determined by the kinds of the DSP programs is referred to as an effecter part.

The resources of the DSP 704 to be managed are the three RAMS. Thus, the resource part comprises the respective portions of the three RAMS. The CPU 701 allocates to the resource part only the DSP program whose resources are not insufficient in each of the three RAMS. Other DSP programs are not allocated so as to avoid occurrence of insufficient resources.

As described above, the DSP 704 adds acoustic effects to the respective waveform data in the two channels. The DSP 704 functions as a stereophonic effecter which adds the same acoustic effect to the respective channels as well as a monaural effecter which adds an independent acoustic effect to each of the channels. In correspondence to the function, in the present embodiment, a form in which the resources of the DSP 704 are distributed to the DSP programs or a basic pattern of combinations of effecter parts allocated to the resource part is determined and the resources of the DSP 704 are allocated to the DSP programs in accordance with the pattern.

Figure 10:
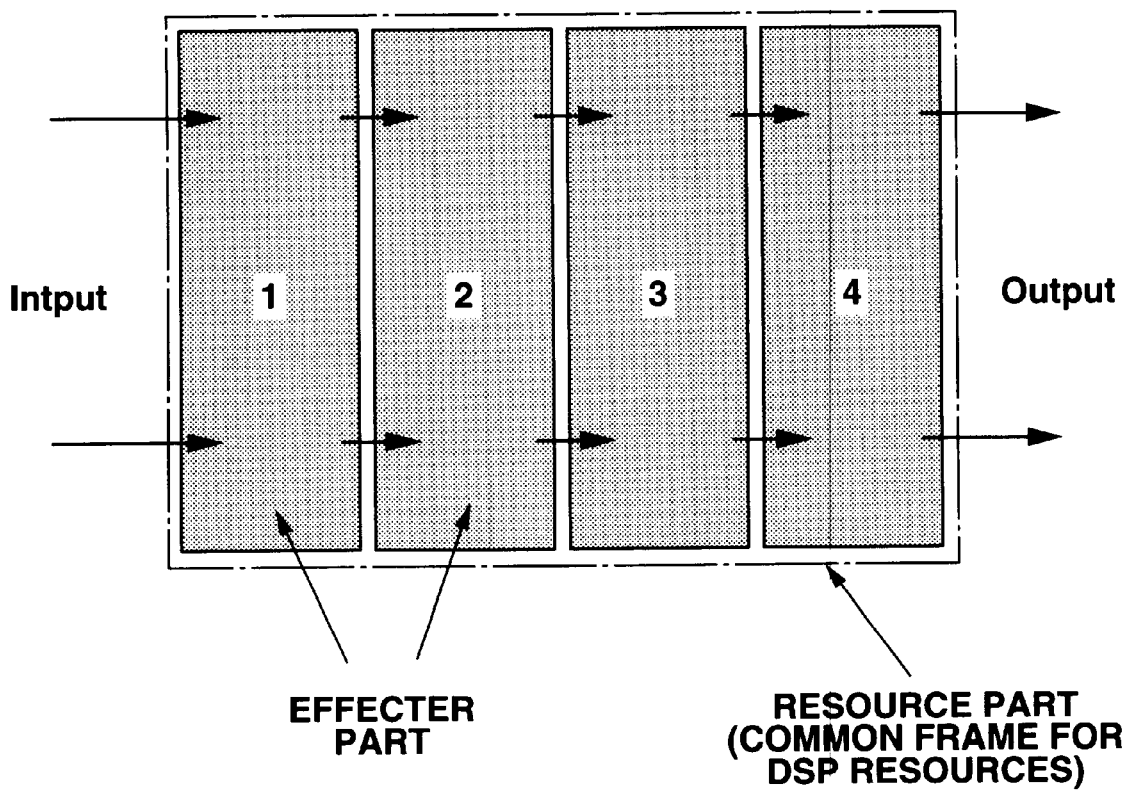
FIG. 10 illustrates distribution of resources of the signal processor in the third embodiment (part 1)
Figure 11:
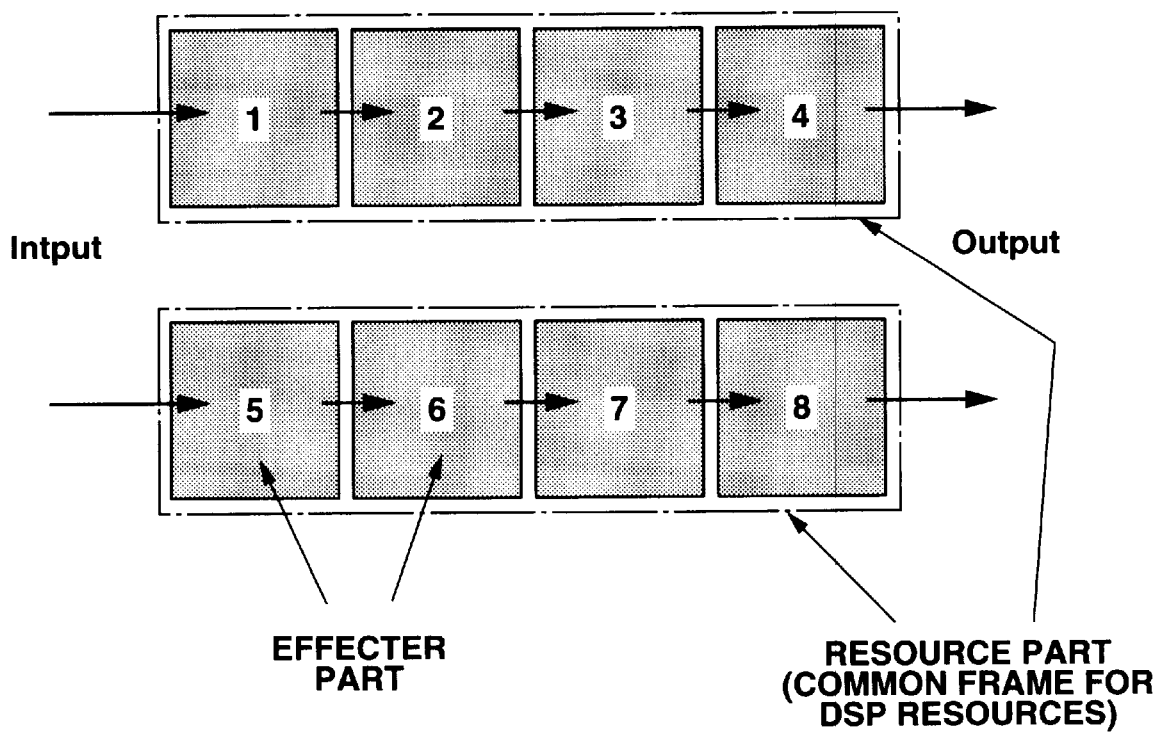
FIG. 11 illustrates distribution of resources of the signal processor in the third embodiment (part 2)
Figure 12:
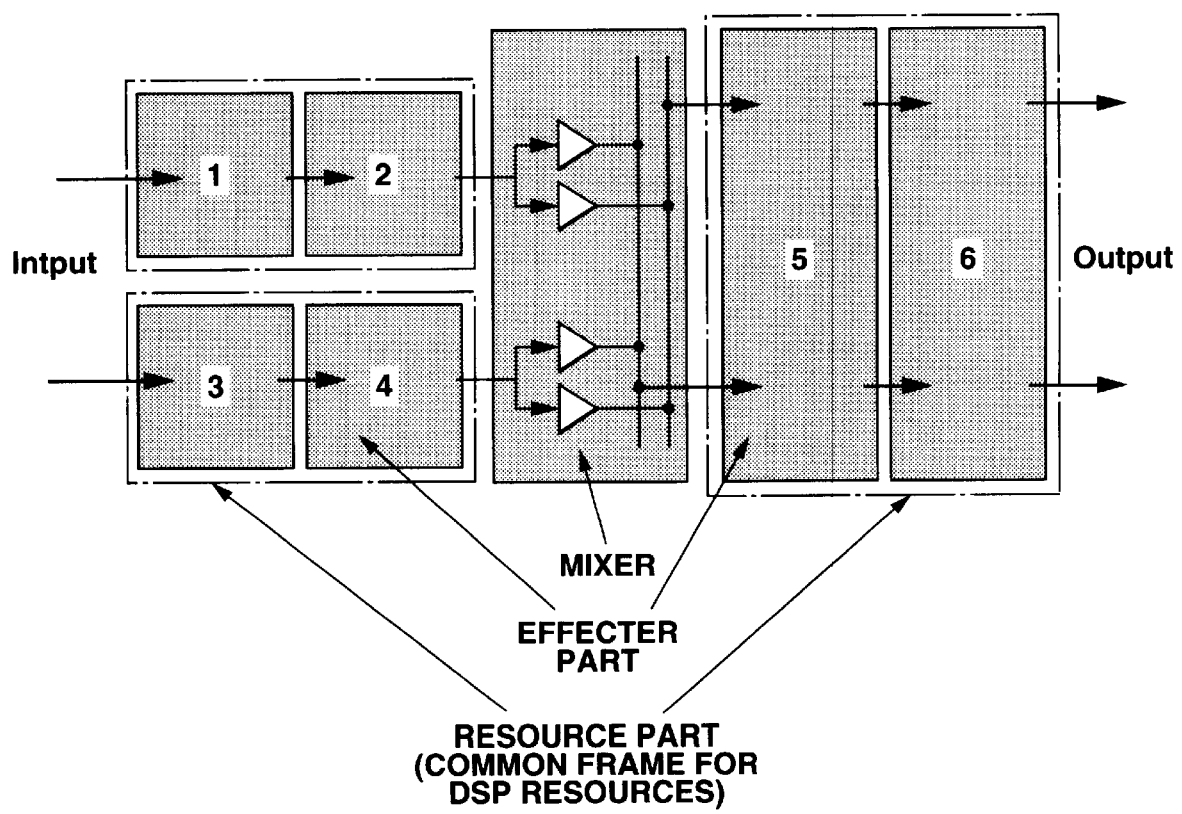
FIG. 12 illustrates distribution of resources of the signal processor in the third embodiment (part 3)

FIGS. 10–12 illustrate a manner in which the resources of the DSP 704 are distributed. As shown in FIGS. 10–12, in the present embodiment, three patterns are prepared as the basic resource distributing form. The respective patterns are managed by corresponding modes, and the resources are distributed in a pattern corresponding to a mode selected by the user. Each pattern is specifically as follows.

The pattern of FIG. 10 is effective when a mode 1 (stereophonic mode) which instructs the DSP 704 to function as a stereophonic effecter is selected. In this mode, a maximum of four DSP programs which processes signals in the stereophonic mode can be actuated.

The pattern of FIG. 11 becomes effective when a mode 2 (monaural mode) is selected which specifies that the DSP 704 should function as a monaural effecter for two independent channels. In this mode, up to four DSP programs can operate in each channel. In other words, two resource parts, each of which accommodates a maximum of four effecter parts, can handle all the resources. Since the DSP programs each process signals in the monaural mode, the DSP programs in one channel may be changed without influencing the other channel.

The pattern of FIG. 12 becomes effective when a mode 3 (mix mode) is set which specifies that acoustic effects are added separately to musical sounds in the respective channels, and that the resulting musical sounds are mixed to produce a stereophonic acoustic effect. In this mode, up to two DSP programs which process signals in the monaural mode, and up to two DSP programs which process signals in the stereophonic mode can operate. A mixer, which transfers a signal between them, redistributes two inputs to two corresponding outputs at any ratio.

The CPU 701 allocates resources to a DSP program which adds an acoustic effect selected by a performer, in a pattern corresponding to a set mode, and also allocates effecter parts to each of the resource parts to thereby add acoustic effects to a musical sound depending on the set mode. A numeral in each effecter part of each of FIGS. 10–12 is a number given to the part.

Figure 13:
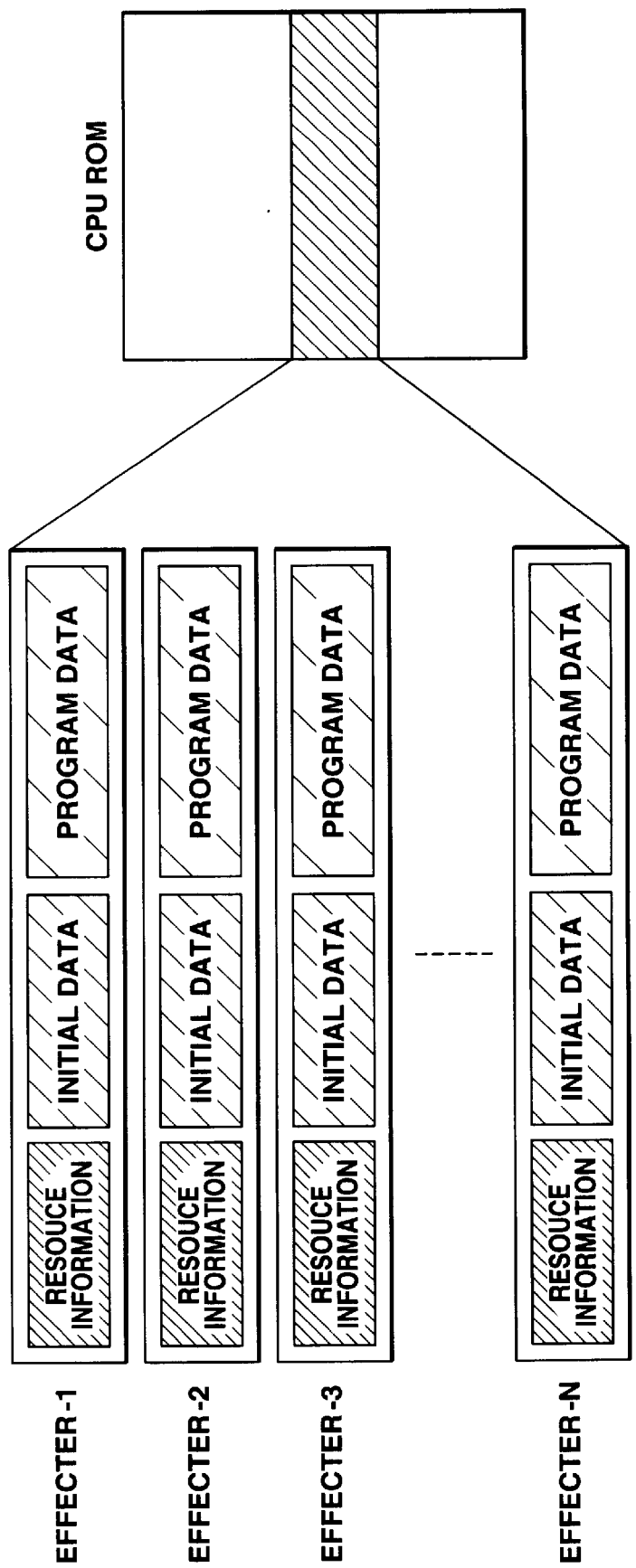
FIG. 13 illustrates a data structure of a program for the signal processor in the third embodiment.

As shown in FIG. 13, the DSP programs stored in the ROM 702 are each mainly composed of three portions: resource information, initial data and program data. The resource information relates to resources necessary for executing a corresponding DSP program (corresponding to an effecter of FIG. 13). The initial data is referred to in the execution of the DSP program and updated depending on the kind of the DSP program as requested. The program data represents the DSP program proper and is composed of instructions (program codes) arranged in order of execution.

FIG. 14 illustrates the contents of the resource information on a table. In FIG. 14, a column "No." represents a number given to a DSP program. A column "FX name" represents a name of a DSP program which indicates the kind of acoustic effect addable to a musical sound by execution of the DSP program. Columns "Mode 1 Part-"–"Mode 3 Part" each represent a range of numbers of allocable appropriate effecter parts of the DSP program when the mode is set. A column "alternative FX" represents a number (indicated by a corresponding name, for convenience's sake) of a DSP program as an alternative to the former DSP program. For example, an alternative FX to a DSP program having an FX name "Comp 2" is "Comp 1". The contents of the column "alternative FX" are referred to when no resources necessary for executing the DSP program remain. A column "Program Size" represents a size of a DSP program concerned or a size of an area in the program RAM

705 consumed when it is stored. Columns "Internal Data Size" and "External Data Size" represents sizes of areas of the work RAM of the DSP 704 and the work RAM 706 used for executing a DSP program. A numerical value indicative of each of the sizes of the area of the RAMS is represented in a predetermined unit.

Each DSP program (effecter) is allocated to an effecter part depending on an acoustic effect, for example, specified by a performer. A DSP program whose number is zero and whose name is "Thru" and a DSP program whose number is 1 and whose name is "St Thru" are prepared to be allocated to unspecified effecter parts.

When the CPU 701 transfers a program to the DSP 704, it refers to information on the resources of the programs, and information on the resources allocated to other programs and on the remaining resources stored as resource managing information and then allocates an appropriate resource to the program. Storage of such information is intended to rapidly add/replace programs to be transferred to the DSP 704.

In the present embodiment, a whole resource is handled as a resource part. Therefore, the resource managing information is stored in units of a resource part or a DSP program. The resource managing information for the resource parts specifically represents, for example, unchangeable prepared sizes of areas of the respective resource parts allocated to the program RAM 705, work RAM 706 and the internal work RAM of the DSP 704. Resource managing information for other effecter parts are, for example, sizes and head addresses of areas allocated to the program RAM 705, work RAM 706 and the internal work RAM of the DSP 704, held for each effecter part (program). The information is handled by respective prepared variables of FIG. 17 or 18.

Three sets of numerical values of FIG. 17 each illustrate concrete values of elements (addresses) specified by the value of a variable "ResPrt" into which the number of a resource part is substituted in each (array) variable when the mode 3 is set. It indicates that a capacity of the program RAM 705 for 480 (=160+160+160) words, a capacity of the internal work RAM for 252 (=84+84+84) words, and a capacity of the work RAM 706 for 4096 (=800+800+2496) words are allocated to the respective resource parts. More specifically, for example in FIG. 2, bracketed three numerical values represent area sizes of each RAM allocated respectively to resource parts having effecter parts whose numbers are 1 and 2, 3 and 4 and 5 and 6. A variable "FxPrt" of FIG. 18 is a one into which the number of an effecter part is substituted. A portion of an array variable, which specifies an address, is omitted in order to avoid confusion unless required especially.

The CPU 701 refers to the resource managing information and resource information and determines whether the resources are allocable to a DSP program to be transferred or whether resources enough to be allocated to the DSP program remains. The CPU 701 provides the following control depending on the result of the determination.

First, when the CPU 701 determines that the resources are allocable to the DSP program, it allocates an area for the DSP program to be transferred next to the area of the latest one of the respective RAMS allocated so far to the other DSP programs. Thus, the CPU 701 changes the contents of a target instruction (program code) based on the allocated area and then transfers the DSP program concerned to the DSP 704. The instruction to be changed is an access instruction, for example, as in the first and second embodiments.

FIG. 15 illustrates a method of changing a program based on the resources or area allocated in the work RAM 706 (access instruction).

In FIG. 15, three series of symbols starting with "riaa" each illustrate an access instruction to be changed, for convenience'sake. A symbols "0010" of an upper series represents the contents of an instruction to be changed in the series of symbols, and implies access to data at an address "10" unless the contents of the instruction are changed. When an area starting with an address "80" is secured, the contents of the instruction are changed to "090" as in an intermediate series of symbols. When an area starting with an address "100" is secured, the contents of the instruction are changed to "110" as in a lower series of symbols. The CPU 701 changes the contents of the instruction so and then transfers the DSP program to the DSP 704.

In order to change the contents of the instruction, in the present embodiment, the program data and initial data are changed to corresponding intermediate codes in accordance with a common rule, which will be described with reference to FIG. 16.

Referring to (a) in FIG. 16, a code that composes program data is composed of an "info" field to which one byte of an MSB side is allocated, and a "Data" field. The code proper is stored in the "DATA" field while information which specifies the contents of an operation on the code proper stored in the "Data" field (hereinafter referred to as additional information, for convenience'sake) is stored in the "info" field.

Main additional information include information which instructs the CPU 701 to inhibit operating on or changing an address value of the code proper in the "Data" field, information which instructs the CPU 701 to add a head address value of the secured area of the program RAM 705 to the address value of the code proper, information which instructs the CPU 701 to add a head address value of the secured area of the internal work RAM to the address value of the code proper, and information which instructs the CPU 701 to add a head address value of the secured area of the work RAM 706 to the address value of the code proper. Other additional information is for realizing transfer of data between the DSP programs. As shown by (b) in FIG. 16, this applies basically to the initial data.

The CPU 701 performs an operation specified by the additional information of the "info" field on a code of the "Data" field or data proper of the program data or initial data, and then transfers the resulting data to the DSP 704. The operation of transferring data between the DSP programs is similar to that performed in the first embodiment, for example.

There are two cases where the DSP program is transferred: one is when there are other DSP programs executed subsequently to the former DSP program, and the other is when there are not.

Since a DSP program having a number "0" or "1" is allocated as a dummy to an effecter part for which the performer specifies no acoustic effect, the former corresponds to allocation of a new DSP program to each of effecter parts having the numbers "1"–"3", whereas the latter corresponds to allocation of a new DSP program to an effecter part having a number "4". No allocation of DSP programs corresponds to the latter irrespective of the numbers of the parts.

In the former case, the quantity of resources allocated to the DSP program can change after the transfer of the DSP program. Thus, in that case, the CPU 701 provides control for absorbing changes in the quantity of resources produced by transfer of the DSP program after completion of transfer of the DSP program. More specifically, when the quantity of resources changes, the CPU 701 reallocates the area allocated to the DSP program after the area allocated to the transferred DSP program (since in the present embodiment the areas are sequentially allocated in the order of increasing address values).

By such reallocation, occurrence of an unused area between the areas allocated to the respective DSP programs and dispersion of such unused areas are avoided. Thus, assignment of areas becomes easy and the control is simplified. Since reallocation of the resources is effected on a program which requires it, the transfer of a program involving the reallocation of the resources is completed in a shorter time.

When the CPU 701 determines that no resources are allocated to a DSP program, it refers to the resource information and searches for an alternative DSP program. If as a result the alternative DSP program is found, the CPU 701 again determines whether there remain resources enough to be allocated to the alternative DSP program. If there is, the CPU 701 allocates the resources to the alternative DSP program, and transfers the DSP program, as described above. If otherwise, similarly, the CPU 701 searches for another alternative DSP program, allocates the resources to the alternative DPS program, and then transfers it. If there is no alternative DSP program or an alternative DSP program has insufficient resources to be allocated, the CPU 701 abandons the transfer of the DSP program when that fact is found.

In the past, when the amount of resources to be allocated to the DSP program become insufficient, the user abandons the use of a function realized by the resources or lists DSP programs where sufficient amounts of resources are allocated in a cut-and-try manner, and searches for an optimal one from among the list. Anyway, in that case, some of the desired functions cannot be used, and a large amount of labor and time are required for searching for alternative functions.

As shown in FIG. 14, in the present embodiment, a second alternative DSP program (effecter) is prepared, which has a quantity of resource consumption smaller than that of the first-mentioned alternative DSP program, and which realizes basically the same function. When the resources are insufficient, such a second alternative DSP program is automatically searched, and transferred to the DSP 704. Thus, a possibility that a desired function cannot used at all is greatly reduced compared to the prior art. It implies that more resources are effectively used and that the efficiency of utilizing the resources is improved. Since a second alternative function is automatically searched, the necessity for a large amount of labor and time is avoided, and hence high facilities are provided for the user.

While in the present embodiment a second alternative DSP program is predetermined, the user may set such program. In that case, not only several candidates for the effecter parts or DSP programs but also their priorities may be set. Priorities may be set on acoustic effects.

Figure 19:
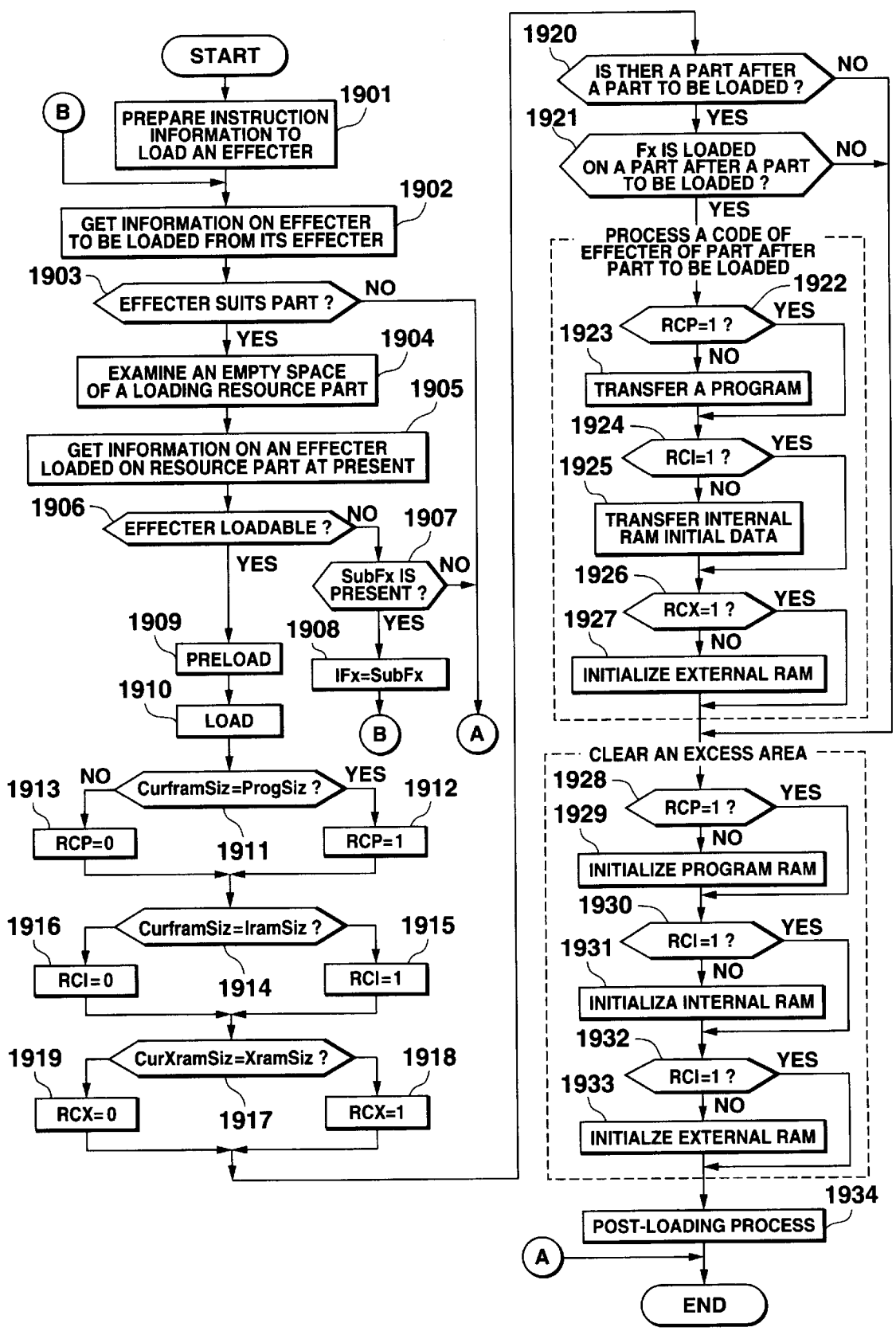
FIG. 19 is a flowchart of a program transferring process effected in the third embodiment.

Transfer of a program by the CPU 701 will be described in detail with reference to FIG. 19 which represents a flow of a process involving transfer or loading of a DSP program, for convenience'sake. When the user instructs the system to add a different acoustic effect to a musical sound in an effecter part, the CPU 701 reads and executes a relevant program stored in the ROM 702 to thereby allocate to the effecter part a DSP program corresponding to the different acoustic effect which the user instructed the system to add.

Specifying, for example, the effecter part and the acoustic effect (the number of the DSP program) set in the effecter part effects the addition of the different acoustic effect to the musical sound. Since the resource distribution is changed depending on the set mode, the acoustic effect set so far is cleared when another mode is set.

First, in set 1901 the CPU 701 prepares instruction information to transfer or load a target DSP program (effecter). More specifically, the CPU 701 substitutes, for example, the number of the target DSP program (effecter) corresponding to the specified acoustic effect into a variable IFx, the number of a resource part to which the DSP program is allocated into a variable DRP, and the number of an effect part in that resource part to which the program is allocated into a variable DFP. Then, in step 1902 the CPU 701 gets resource information based on the number of the target DSP program (effecter) or the value of the variable "Ifx", and hence gets a range of numbers of suitable parts one of which the target DSP program has become in the set mode. In addition, the CPU 701 substitutes numerical values representing a size of a usable area of the program RAM 705, a size of a usable area of the internal work RAM, a size of a usable area of the external work RAM 706, and the number of an alternative effecter into variables "ProgSiz", "IramSiz", "XramSiz", and "SubFx", respectively.

The CPU 701 then shifts its control to step 1903, where it determines whether the target DSP program is suitable for the effecter part. For example, when a DSP program which processes signals in the monaural mode is allocated to an effecter part to which a DSP program which processes signals in the stereophonic mode is assumed to be allocated, that is, when as a result an acoustic effect (DSP program) specified by the performer is not suitable for the effecter part, the determination becomes NO and the CPU 701 then terminates the process. If otherwise in step 1903, the determination becomes YES, and the CPU 701 shifts its control to step 1904. The determination in step 1903 includes examining whether the number of the effecter part specified by the performer falls within the range of numbers of the suitable parts gotten in step 1902.

In step 1904, the CPU 701 examines an empty area in each of the RAMS for a resource part having an effecter part for which allocation of the DSP program is specified. For example, the CPU 701 examines unused quantities of the program RAM 705, internal work RAM and work RAM 706 or the respective values of the variables "ProSp [ResPrt]", "IramSp [ResPrt]" and "XramSp [ResPrt]". Then, in step 1905, the CPU 701 gets information on the DSP program allocated at present to the target effecter part, for example, by substituting the number (for example, the value of the variable "FX [Res Prt] [FxPrt]" of FIG. 18) of the DSP program allocated to the part into a variable CurFx, reading out the resource information of the program, and substituting numerical values representing a size of a usable area of the program RAM 705, a size of a usable area of the internal work RAM and a size of a usable area of the external work RAM 706 into variables "CurProgSiz", "CurIramSiz", and "CurXramSiz", respectively.

The CPU 701 then shifts its control to step 1906, where it determines whether the DSP program specified by the performer is transferable or whether there remain resources to be allocated to the DSP program. There are three kinds of RAMS as the resources, and the resources of the DSP program allocated to the effecter parts. Thus, when the total of the values of the variables "CurProgSiz" and "ProgSp" is not less than the value of the variable "ProgSiz" (CurProgSiz+ProgSp≧ProgSiz), and when the total of the values of the variables "CurIramSiz" and "IramSp" is not less than the value of the variable "IramSiz" (CurIramSiz+

IramSp≧IramSiz), and when the total of the values of the variables "CurXramSiz" and "XramS" is not less than the value of the variable "XramSiz" (CurProgSiz+ProgSp≧ProgSiz), the resources are not insufficient. Thus, in that case, the determination becomes YES, and the CPU 701 shifts its control to step 1909. If otherwise, the determination becomes NO.

Then, the CPU 701 shifts its control to step 1907, where it determines whether there is a DSP program as an alternative to the target DSP program (effecter). If there is, the CPU 701 substitutes a value not less than 3 into the variable "SubFx" in step 1902 (FIG. 14). Thus, when the value of the variable "SubFx" is not less than 3, the determination becomes YES. Thus, the CPU 701 substitutes the value of the variable "SubFx" into the variable "Fx" in step 1908, and then returns its control to step 1902. Thus, instead of the target DSP program, the CPU 701 effects the subsequent steps similarly. If otherwise, the determination becomes NO, the CPU 107 determines that there are no DSP programs to which the performer can add desirable acoustic effects, and then terminates the process.

By executing the processing loop composed of steps 1902–1908, the CPU 701 automatically retrieves an alternative DSP program for which no resources becomes insufficient to thereby satisfy the performer's desire.

In step 1909, the CPU 701 effects a pre-loading process to prevent occurrence of noise, for example by muting, before the transfer (loading) of the DSP program. Then, in step 1910 the CPU 701 effects a loading process which includes performing an operation specified by additional information of the "info" field of the DSP program to be replaced on the contents of the initial data and program data of the DSP program (FIG. 13) read sequentially, starting with the head address of an area of each of the RAMS allocated to the DSP program, and transferring the resulting data to the DSP 704 (FIGS. 15 and 16). Simultaneously, the CPU 701 instructs the DSP 704 to initialize the work RAM 706. Step 1911 is next. The various variables (array variables) of FIG. 18 are referred to in the loading process.

That the quantity of resources allocated to the transferred DSP program is different to that allocated to the transferred DSP program after the transfer of the DSP program or the quantity of resources of the effecter parts has been changed by the transfer of the DSP program implies that a new unused area has been produced or resources allocated to another DSP program have been used by the transfer of the former DSP program. Thus, in steps 1911–1919 the CPU 701 determines a change in the quantity of resources (areas) for each of the program RAM 705, the internal work RAM of the DSP 704, and the work RAM 706, and substitutes the values "0" or "1" indicative of the results of the determinations into beforehand prepared variables RCP, RCI and RCX, respectively. The value "0" represents that the quantity of resources of the RAM concerned has changed and that the value "1" represents that the quantity of resources of the RAM concerned has not changed.

Then, in step 1920 the CPU 701 determines whether there is an effecter part after the effecter part to be transferred or whether there is an effecter part having a larger number than the effecter part to be transferred.

For example, when the CPU 701 newly allocates a DSP program to an effecter part having a number "4" of FIG. 10, the determination in step 1920 becomes NO, and the CPU 701 shifts its control to step 1928.

If otherwise, the determination becomes YES, and then the CPU 701 shifts its control to step 1921, where the CPU 701 determines whether a DSP program is allocated to an effecter part after that to be transferred. When a different mode is selected, the CPU 701 allocates a dummy or a predetermined DSP program to each effecter part. Thus, when the CPU 701 transfers the DSP program allocated to the effecter part, the determination becomes NO, and then the CPU 701 shifts its control to step 1928. If otherwise, the determination becomes YES, and the CPU 701 shifts its control to step 1922.

The determination of YES in step 1921 implies that the quantity of resources has changed due to transfer of the DSP program in step 1910. In steps 1922–1927, the CPU 70i performs a process corresponding to the change in the quantity of resources. First, in step 1922, the CPU 701 determines whether the value of the variable RCP is 1. When the area for the effecter part to be transferred in the program RAM 705 has not been changed by the transfer of the effecter part, the determination becomes YES, and the CPU 701 then shifts its control to step 1924. If otherwise, the determination becomes NO, and then the CPU 701 shifts its control to step 1923, where it operates on the contents of the target instruction of the DSP program (program data) allocated to a rear effecter part and then retransfer the resulting DSP program to an area of the program RAM 705 for the DSP program subsequent to that of the program RAM 705 for the DSP program (program data) transferred in step 1910. The CPU 701 updates the variable "ProgTop" of FIG. 18 when the DSP program was retransferred.

Then, in step 1924 the CPU 701 determines whether the value of the variable RCI is 1. When the area of the internal work RAM of the DSP 704 for the effecter part to be transferred is not changed by the transfer of the effecter part, the determination becomes YES, and then the CPU 701 shifts its control to step 1926. If otherwise, the determination becomes NO, and then the CPU 701 shift its control to step 1925, where the CPU 701 operates on the initial data of a DSP program (initial data) allocated to a rear effecter part and then retransfer the resulting DSP program to an area of the internal work RAM subsequent to that of the internal work RAM for the DSP program (initial data) transferred in step 1910. The CPU 701 updates the variable "IramTop" of FIG. 18 when the DSP program was retransfrred.

Then, in step 1926 the CPU 701 determines whether the value of the variable "RCX" is 1. When the area in the work RAM 706 for the effecter part to be transferred is not changed by the transfer of the effecter part, the determination becomes YES, and then the CPU 701 shifts its control to step 1928. If otherwise, the determination becomes NO, and then the CPU 701 shifts its control to step 1927, where it initializes the work RAM 706. The CPU 701 also updates the variable "XramTop" of FIG. 18 simultaneously. Then, the CPU 701 shifts its control to step 1928.

When the steps 1922–1928 are effected, the respective areas of the RAMS allocated to the respective effecter parts are rearranged so as to be continuous sequentially and unused areas of the respective RAMS change. In steps 1928–1933, a process corresponding to the change in the unused areas of the RAMS is effected, which is basically the same as the process effected in steps 1922–1927. In the process, the CPU 701 determines the RAMS whose unused areas have changed from the values of the corresponding variables, and initializes the changed areas of the RAMS.

Then, in step 1934 the CPU 701 determines that the transfer of the target DSP program and the process involving this transfer have been completed, effects a post-loading process which includes releasing the muting operation, and then terminates the process. When there is still another DSP program to be transferred, the CPU 701 again effects the program transferring process of FIG. 19.

While the first-third embodiments handle the DSP provided on the electronic musical instrument as an object whose resources are managed, the DSPS provided on other devices may be handled as objects whose resources are managed. The resources of the DSPS are not limited to memories such as RAMS, but may be other general-purpose hardware such as oscillators, arithmetic and control units or LFOS. Alternatively, they may be realized as devices, which merely change the contents of a program. The present invention is applicable to existing systems by loading programs (including program address tables and DSP RAM address tables) for realizing the above mentioned operations of the CPU. Those programs may be recorded in recording mediums such as CD-ROMS, floppy disks or optical magnetic disks and distributed, for example, via telecommunication lines of a public network.

What is claimed is:

1. A resource managing apparatus for a signal processor, said apparatus managing a storage area of first storage means of the signal processor which stores a plurality of programs each of which controls a process executed by the signal processor, said apparatus comprising:

selecting means for selecting from among the plurality of programs stored in said second storage means only programs which satisfy predetermined conditions based on a size of a storage area necessary for executing the programs and a size of an empty storage area of the first storage means;

program reading means for reading only the programs selected by said selecting means;

instruction changing means for changing the contents of a particular one of instructions of the program read out by said program reading means; and transferring means for transferring the program including the particular instruction whose contents have been changed by said instruction changing means to a specified storage area of the first storage means.

2. The apparatus according to claim 1, wherein said instruction changing means detects a particular instruction to be changed from among the instructions of the read-out program, the particular instruction specifying at least one of an area from which data should be read out and an area in which data should be stored, and changes the contents of an address section of the particular instruction.

3. A resource managing apparatus for a signal processor for managing a storage area of first storage means of the signal processor which stores a plurality of programs each of which controls a process executed by the signal processor, said apparatus comprising:

program specifying means for specifying one of the plurality of programs stored in the first storage means;

program reading means for reading out a program to be transferred to the first storage means of the signal processor from second storage means which contains a plurality of types of programs;

first instruction changing means for changing the contents of an instruction of the program read out by said program reading means so as to be allocated to the storage area of the first storage means allocated to the program specified by said program specifying means;

transferring means for transferring the program which includes the instruction whose contents have been changed by said instruction changing means to the storage area of the first storage means allocated to the program specified by said program specifying means;

detecting means for detecting a difference in size between the storage area which the program transferred by said transferring means occupies and the storage area which the program specified by said program specifying means occupies; and second instruction changing means for changing the contents of an instruction of the program stored in the first storage means other than the program specified by said program specifying means based on the difference in size detected by said detecting means.

4. The apparatus according to claim 3, wherein said second instruction changing means changes the contents of an instruction of a program stored in a storage area of the first storage means subsequent to the storage area where the program specified by said program specifying means is stored.

5. A program transferring method comprising:

selecting from among a plurality of programs which are prestored in a transfer program storage means and which each control a process executed by a signal processor, only programs which satisfy predetermined conditions based on a size of a storage area necessary for executing the programs and a size of an empty storage area of a processed program storage means of the signal processor;

reading only the selected programs;

changing the contents of a particular one of instructions of the read-out program; and transferring the program which includes the particular instruction whose contents have been changed to the processed program storage means of the signal processor.

6. A program transferring method comprising:

specifying one of a plurality of programs stored in a first storage means for controlling a process executed by a signal processor;

reading out a program to be transferred to the first storage means of the signal processor from a second storage means which contains a plurality of types of programs;

changing the contents of an instruction of the read program so as to be allocated to a storage area of the first storage means allocated to the specified program;

transferring the program which includes the instruction whose contents have been changed to the storage area of the first storage means allocated to the specified program;

detecting a difference in size between the storage area which the transferred program occupies and the storage area which the specified program occupies; and changing the contents of an instruction of the program stored in the first storage means other than the specified program based on the detected difference in size.

7. A recording medium which prestores a computer readable program for:

selecting from among a plurality of programs which are prestored in a transfer program storage means and which each control a process executed by a signal processor, only programs which satisfy predetermined conditions based on a size of a storage area necessary for executing the programs and a size of an empty storage area of a processed program storage means of the signal processor;

reading only the selected programs;

changing the contents of a particular one of instructions of the read-out program; and transferring the program which includes the particular instruction whose contents have been changed to the processed program storage means of the signal processor.

8. A recording medium which prestores a computer readable program for:

specifying one of a plurality of programs stored in a first storage means for controlling a process executed by a signal processor;

reading out a program to be transferred to the first storage means of the signal processor from a second storage means which contains a plurality of types of programs;

changing the contents of an instruction of the read program so as to be allocated to a storage area of the first storage means allocated to the specified program;

transferring the program which includes the instruction whose contents have been changed to the storage area of the first storage means allocated to the specified program;

detecting a difference in size between the storage area which the transferred program occupies and the storage area which the specified program occupies; and changing the contents of an instruction of the program stored in the first storage means other than the specified program based on the detected difference in size.

* * * * *